United States Patent
Aoshika et al.

(10) Patent No.: US 6,532,435 B1
(45) Date of Patent: Mar. 11, 2003

(54) REMOTE MONITORING SYSTEM, AN AUTOMATIC SETTING APPARATUS FOR SETTING A NEAR-END VALUE FOR MANAGING A CONSUMPTION COMPONENT UTILIZED IN THE REMOTE MONITORING SYSTEM, AND A RECORDING MEDIUM HAVING AN AUTOMATIC SETTING PROGRAM RECORDED THEREON AND READABLE BY A COMPUTER

(75) Inventors: Masashi Aoshika, Kawasaki (JP); Kazuya Sano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/487,497

(22) Filed: Jan. 19, 2000

(30) Foreign Application Priority Data

Apr. 20, 1999 (JP) .......................................... 11-111862

(51) Int. Cl.[7] .............................................. G06F 19/00
(52) U.S. Cl. ........................ 702/188; 702/188; 705/16; 705/21; 705/73; 709/222; 709/224; 370/254
(58) Field of Search .......................... 702/188; 705/16, 705/21, 73; 709/222, 224, 223, 227, 245, 250; 370/254

(56) References Cited

U.S. PATENT DOCUMENTS 5,425,026 A * 6/1995 Mori ........................... 370/60
6,285,688 B1 * 9/2001 Henderson et al. ......... 370/516
6,311,165 B1 * 10/2001 Coutts et al. ................. 705/21
2002/0010865 A1 * 1/2002 Fulton et al. ............... 713/201

FOREIGN PATENT DOCUMENTS

WO   WO 98/26530   * 6/1998   ............. H04J/3/02

* cited by examiner

Primary Examiner—Marc S. Hoff
Assistant Examiner—Ellias Desta
(74) Attorney, Agent, or Firm—Staas & Halsey LLP

(57) ABSTRACT

A remote monitoring system includes an object apparatus and a monitoring apparatus monitoring a current state of the object apparatus over a communications network. The object apparatus includes a state information reporting unit reporting information about the current state of the object apparatus, and a test data generating unit generating test data and controlling the state information reporting unit to output the test data to the monitoring apparatus via the communications network. The monitoring apparatus includes a test data returning unit returning the test data back to the object apparatus via the communications network so that the test data generating unit of the object apparatus compares the returned test data with the test data generated by the test generating unit to discriminate whether the state information reporting unit is in condition for normal reporting.

23 Claims, 15 Drawing Sheets

FIG. 9

POOLED INFORMATION SCREEN — 151

| | DATE AND TIME OF INTRODUCTION AND MOVEMENT | INTRODUCTION (MOVEMENT SOURCE) | MOVEMENT DESTINATION | NAME OF TERMINAL | CLASSIFICATION |
|---|---|---|---|---|---|
| ☑ | 1998/10/26 12:00:00 | STORE 21 | STORE 22 | POS TERMINAL 11 | INTRODUCTION |
| ☐ | 1998/10/27 12:00:00 | STORE 22 | STORE 23 | POS TERMINAL 12 | MOVEMENT |
| ☐ | 1998/10/28 12:00:00 | STORE 21 | STORE 22 | POS TERMINAL 13 | INTRODUCTION |

152 — 156 — 153 — 154 APPROVAL — 155 CANCEL

US 6,532,435 B1

REMOTE MONITORING SYSTEM, AN AUTOMATIC SETTING APPARATUS FOR SETTING A NEAR-END VALUE FOR MANAGING A CONSUMPTION COMPONENT UTILIZED IN THE REMOTE MONITORING SYSTEM, AND A RECORDING MEDIUM HAVING AN AUTOMATIC SETTING PROGRAM RECORDED THEREON AND READABLE BY A COMPUTER

BACKGROUND OF THE INVENTION

1) Field of the Invention

The present invention relates to a technology for remotely monitoring an object apparatus such as a POS terminal, a cash dispenser in a bank or the like by way of a communication network such as a public telephone wiring network, WAN/LAN or the like. More particularly, the present invention relates to a remote monitoring system composed of an object apparatus and a monitoring apparatus for remotely monitoring the object apparatus by way of a communication network. Further, the present invention relates to an apparatus for use in the remote monitoring system and for automatically setting a near-end value useful for detecting that a consumption component employed in the object apparatus is coming close to its end of life (near-end). Furthermore, the present invention relates to a recording medium having an near-end value automatic setting program recorded thereon and readable by a computer.

2) Description of the Related Art

In general, a store such as a convenience store or the like has a POS system (Point-Of-Sales: system for managing information acquired upon selling goods) introduced. Thus, the store is equipped with a POS terminal (terminal apparatus, or an object apparatus) and the terminal serves as a register in the store. For example, if a firm provides a number of stores as chain stores for deploying a sales operation, since a plurality of POS terminals of the same type are provided in an identical store, the total number of POS terminals of all chain stores can come up to a great number.

Therefore, if a worker such as a CE (Customer Engineer) or the like is delivered to each of the stores for carrying out maintenance operation of the POS terminal and the worker checks the sending condition of each POS terminal (e.g., information of preventive maintenance concerning the condition of a consumption component), a lot of time and labor will be required for the maintenance operation.

For this reason, recently, a remote monitoring system has been arranged so that a number of POS terminals can be monitored collectively in a remote control fashion by a monitoring apparatus provided in a control center, a remote maintenance center or the like. According to the remote monitoring system, each of the POS terminals is connected to a monitoring apparatus by way of a public wiring network, WAN (Wide Area Network)/LAN (Local Area Network) or the like. Then, a reporting unit is arranged so that information concerning the using condition of the respective POS terminals is detected and a packet of the information is created for reporting the spending condition to the monitoring apparatus by way of the communication network.

According to the remote monitoring system arranged as described above, the preventive maintenance information of each POS terminal is sent from the reporting unit to the monitoring apparatus by way of the communication network. Then an operator or the like having received the report provides instruction that a CE or the like shall be delivered to a store in response to the preventive maintenance information.

Further, actual spending condition of a consumption component (e.g., a number of typed lines of a thermal printer, a display time of a CRT or the like) is detected in each of the POS terminals and the detected spending condition is reported from the reporting unit to the monitoring apparatus periodically. When the monitoring apparatus receives the information concerning the using condition sent from the respective POS terminals, and it is recognized that the life of the consumption component of the respective POS terminal is coming close to the end of its life (near-end), then a near-end alarm is generated. When the CE is informed of the near-end alarm, the CE is dispatched to the store with a spare component corresponding to the consumption component, and the consumption component is replaced with the spare component at the store before a life terminating alarm is generated.

According to the above-described remote monitoring system, if a new POS terminal is introduced into a store or an already installed POS terminal is moved from one store to another, it is checked whether or not the POS terminal is connected in a communicative fashion with the monitoring apparatus by way of the communication network.

The above-described checking operation is merely a general network check in which it is confirmed whether the newly introduced POS terminal or the moved POS terminal is connected to the monitoring apparatus by way of the communication network in a communicative fashion. That is, it is merely confirmed whether the POS terminal is physically connected to the communication network or not.

According to the current remote monitoring system, if the POS terminal is physically connected to the communication network, it is regarded that the reporting unit of the POS terminal is capable of informing the using condition of the POS terminal to the monitoring apparatus. Therefore, it is not confirmed whether the POS terminal can really inform the using condition of the POS terminal to the monitoring apparatus without failure. Therefore, it is natural that there is no means for check the function of the POS terminal.

If the POS terminal is connected to the communication network and the check on the network connection indicates a satisfactory result in terms of physical connection, there can be still a chance of malfunction that a software does not work well in sending a message from the reporting unit of the POS terminal to the monitoring apparatus. Alternatively, if the POS terminal or the monitoring apparatus suffer from a wire cut in circuits thereof, it becomes impossible to send a message from the POS terminal to the monitoring apparatus without failure.

According to the current remote monitoring system described above, in spite of the fact that the monitoring system suffers from the above malfunction, the POS terminal starts to be operated under condition that the above network check shows a temporary satisfactory result. Therefore, if it is found that the reporting unit was incapable of sending a message to the monitoring apparatus satisfactorily after the system is brought into operation, then the operator of the system judges that there is any trouble in the reporting system including the POS terminal and the monitoring apparatus. Thus, a worker such as a CE or the like takes any action against the trouble.

As shown in FIG. 12, even if a new POS terminal 11 is introduced into the system at a location (store) 21 and a network check indicates a satisfactory result, it cannot be guaranteed that the reporting unit of the POS terminal 11 is capable of sending a message correctly to the monitoring apparatus 30. If the reporting unit of the POS terminal 11 has sent a message satisfactorily to a monitoring apparatus 30 upon the introduction to the system, and thereafter the POS terminal 11 is moved from the location (store) 21 to a location (store) 22, the remote monitoring system also suffers from the problem that the reporting unit of the POS terminal works satisfactorily or not. That is, even if the network check indicates a satisfactory result after the movement is achieved, which fact does not guarantee that the reporting unit of the POS terminal 11 is capable of sending a message to the monitoring apparatus 30 satisfactorily.

In general, it is extremely rare case that a terminal apparatus such as a personal computer is introduced into a predetermined location and then it is moved to a completely different location. However, for example, if a number of chain stores are provided to deploy a selling operation and a POS terminal of a same type is provided in each of the stores, a POS terminal can be introduced into a newly built store or a POS terminal can be moved from one store to another. For this reason, if it can be checked upon introduction or movement of the POS terminal whether or not the reporting unit of the POS terminal is capable of sending a message correctly to the monitoring apparatus, in addition to the check of physical connection to the network, the POS terminal will be brought into an operation mode with ease and the worker such as a CE or the like will be released from load of maintenance.

Now, description will be made on how the monitoring apparatus collects location information (location status) of the POS terminals in the current remote monitoring system with reference to FIG. 13.

According to an arrangement shown in FIG. 13, a couple of POS terminals 11, 12 provided in the same store are connected to a communication network (not shown) by way of a router 51. A monitoring apparatus 30 is also connected to the communication network by way of a router 52. Thus, the POS terminals 11, 12 and the monitoring apparatus 30 are made capable of communicating with each other through the routers 51, 52 and the communication network.

If the network is a network employing TCP/IP (Transmission Control Protocol/Internet Protocol), for example, the location information of the POS terminals is collected by ARP (Address Resolution Protocol) or PING (Packet Internet Groper).

When ARP is employed for collecting the information, the POS terminals 11, 12 communicate with the router 51 periodically and the router 51 generates an ARP table 50.

When the router 51 transmits the ARP table 50 to the monitoring apparatus 30 by way of the router 52, the location information concerning the POS terminals 11, 12 is collected at the monitoring apparatus 30 (see an arrow symbol of a solid line in FIG. 13).

When PING is employed for collecting the information, the monitoring apparatus 30 generates a PING command in which IP addresses of the network to which the POS terminal 11 or 12 is connected, of four octets are changed from 0 to 255 in order, so that the PING command is supplied to the TCP/IP network in order (see an arrow symbol a dot line in FIG. 13). Then, the monitoring apparatus 30 collects the location information concerning the POS terminals 11, 12 by recording the IP address of the POS terminals corresponding to the PING command.

In either of the above cases, when the location information concerning the POS terminals is collected in the current remote monitoring system, a great number of packets, which often become useless, shall be transmitted to the communication network periodically. Therefore, the network suffers from a heavy load in transmitting signals. For this reason, it is requested that the location information concerning the POS terminals be positively collected without imposing a heavy load on the communication network.

When the location information concerning the POS terminals is collected in a manner described above, the information is formed into a location management screen and then the image is displayed on a displaying unit (display) of the monitoring apparatus 30. Thus, an operator or the like is informed of the current system arrangement status by means of the displayed image. FIG. 14 shows an example of the location management screen. As shown in FIG. 14, a location management screen 61 contains an indication of the POS terminal 11, which has been described with reference to FIG. 12. In the case of FIG. 14, the POS terminal 11 is newly introduced into the location (store) 21 and also the same POS terminal 11 is moved thereafter from the location 21 to the location (store) 22.

When the monitoring apparatus 30 recognizes that the POS terminal 11 is moved to the location 22 based on the location information collected after the POS terminal 11 is moved, the indication of the POS terminal 11 corresponding to the location (system arrangement status) after the movement is carried out is displayed on the location management screen 61. However, according to the current technology shown in FIG. 14, the indication of the POS terminal 11 corresponding to the location status before the movement is carried out is still left undeleted on the location management screen 61. For this reason, the location management screen 61 does not tied up with the current system arrangement status, and thus it can be seen as if the POS terminal 11 was introduced into the location 22.

As has been described above, it is a rare case that a terminal apparatus such as a personal computer is newly introduced into a network system and then the same terminal apparatus is moved within the network system. Further, according to the collecting method for collecting the location information described with reference to FIG. 13, if the newly introduced POS terminal is incapable of generating information concerning the location information because the terminal is not energized, it can be observed from the monitoring apparatus 30 as if the POS terminal was still not introduced. Therefore, it is impossible to discriminate whether the POS terminal is not energized or the POS terminal is absent due to movement. For this reason, according to the current remote monitoring system, it is impossible to provide a location management screen which can be automatically updated in accordance with the current status of location in which it is taken into account that the POS system can be moved within the system. Therefore, an operator (manager) shall delete, by a manual operation, the indication of the POS terminal corresponding to the location status in which the POS terminal has not been moved.

If the size of a firm is large, the number of POS terminals to be introduced will reach several hundreds to several thousands. Further, it is expected that the introduced POS terminals are moved within the network system under management of the firm. If such a situation is brought about, the method for collecting the location information described with reference to FIG. 13 will not provide an effective assistance with regard to when and into which store the POS terminal is introduced or to which store the POS terminal is moved. Further, the location management screen 61 deriving from the above information collecting method cannot be automatically updated in accordance with the current location status containing the introduction and the movement. Therefore, if it is desired to obtain a location management screen 61 updated with the current arrangement status, the operator (manager) of the system shall carry out the updating operation by a manual operation, which fact requires a large number of management steps, imposing a heavy load on the operator (manager).

Therefore, it is desired that the monitoring apparatus 30 can be informed of the current location status of the POS terminals and updates the location management screen 61 automatically in accordance with the last issued location information, so that the operator can manage the location of the POS terminals positively and is relieved from the management load.

Incidentally, each of the POS terminals composes a consumption component (component which shall be replaced with new one when it is worn out) such as a thermal printer unit, a CRT or the like. In order to monitor the consumption component of the POS terminal by the remote monitoring system, the monitoring apparatus 30 is arranged to compare numerical data (number of typed lines of letters of the printer or the like) indicative of the spending condition of the consumption component supplied from each of the POS terminals with a predetermined near-end value (value set in accordance with the expected life of the component so as to be smaller than the expected life by a predetermined allowance). If it is found that the numerical data indicates the consumption component is coming close to the near-end value, a near-end alarm is generated. Thereafter, if any measure (such as replacing the component with a spare component) is not taken in response to the near-end alarm and the numerical data reaches a predetermined life terminating value, then a life terminating alarm is generated.

In this case, the spending condition of the consumption component will differ depending on the operating condition of each POS terminal even if the POS terminals are the same type and provided in the same store. Therefore, the generating interval (allowance) between the timing point when the near-end alarm is generated and the timing point when the life terminating alarm is generated shall be determined depending on the detected spending condition information of the consumption component of each POS terminal, and shall not be determined uniformly over the all POS terminals.

If the timing point when the near-end alarm is generated is inflexibly decided and the consumption component is replaced with a new one soon after the near-end alarm is generated, this manner of maintenance is substantially the same as a manner of maintenance in which the replacement of the component exchange is carried out soon after part trouble is brought about. In other words, the timing point when the replacement of the component is carried out is merely changed from the timing when the trouble is brought about to the timing point when the near-end alarm is generated. Therefore, such a manner of maintenance cannot effectively reduce the load to be imposed on the worker such as CE or the like. Further, since it is not sure that the spare part is available upon necessity, generally, certain time interval is required for replacing the consumption component with a new one after the near-end alarm is generated.

As set forth above, however, the generating interval between the near-end alarm and the life terminating alarm shall be variable depending on the spending condition of the consumption component. Therefore, if component replacement is carried out a constant time interval after the near-end alarm is generated, there is a fear that the component replacement cannot be in time before the consumption component reaches the end of life, with the result that a trouble is caused in the consumption component. In addition, there is a fear that the component replacement is carried out too early with respect to the timing point when the consumption component reaches the end of life. In this case, the consumption component is replaced with a spare component in spite of the fact that the component still holds an allowance of life, which fact means that the component is not effectively utilized.

According to the current manner of maintenance, in order to keep constant (e.g., three months) the time interval between the near-end generation and the life terminating alarm generation, the operator of the system carries out a manual operation periodically on the monitoring apparatus 30 so that the near-end value is corrected and set for each of the POS terminals. FIG. 15 is a flowchart including steps of S51 to S61 useful for explaining the process carried out by the monitoring apparatus 30 for monitoring the consumption component of the current status.

As shown in FIG. 15, initial set values of the near-end value and the life terminating value are set at step S51. Then, the POS terminals are brought into an operation mode. When numerical data such as count data (e.g., typed line number of a thermal printer, display time of a CRT or the like) are sent from each POS terminal, the data are accumulated in a counter file at step S52.

If the operator does not set the near-end value (NO route of step S53), the count data accumulated in the counter file is compared with the near-end value at step S54. If it is determined that the count data (YES route of step S54), then the near-end alarm is generated at step S55. Thereafter, the count data accumulated in the counter file is compared with the life terminating value at step S56. If component replacement is not carried out and the count data reaches the life terminating value (YES route of step S56), the life terminating alarm is generated at step S57.

If the operator sets the near-end value (YES route of step S53), the operator makes reference to the count data in the counter file, and calculates manually to obtain the changing amount per unit time of the count data, i.e., an actual spending rate per unit time of the consumption component (step S58). Then, the changing amount (amount of spending) and the predetermined reference value are compared with each other at step S59. If the changing amount falls in a range of 90 to 110% of the reference value, the near-end value is maintained as it is. If the changing amount stays below 90% of the reference value, then the current near-end value is replaced with a value larger than the current near-end value (step S60) while if the changing amount exceeds above 110% of the reference value, then the current near-end value is replaced with a value smaller than the current near-end value (step S61).

That is, if the actual spending rate per unit time is small, then the time interval from the near-end to the end of life is expected to be long. Therefore, it is reasonable to correct the near-end value to be larger (closer to the life terminating value). Thus, the current near-end value is replaced with a larger one. On the other hand, if the actual spending rate per unit time is large, then the time interval from the near-end to the end of life is expected to be short. Therefore, it is reasonable to correct the near-end value to be smaller. Thus, the current near-end value is replaced with a smaller one. In this way, the interval between the near-end alarm and the life terminating alarm can be maintained constant.

The processing carried out at steps of S53 and S58 to S61 described above (near-end setting processing) is executed periodically in a manual fashion depending on the operator's decision.

However, since the correcting and setting operation of the near-end value for maintaining the interval between the near-end alarm and the life terminating alarm is executed in a manual fashion depending on the operator's decision, the following drawbacks are brought about.

① Since the correcting and setting operation of the near-end value shall be executed periodically for each POS terminal, if the number of POS terminals is large, the operator is always placed under duty of correcting and setting operation.

② Since the correcting and setting operation of the near-end value is executed periodically in a manual fashion depending on the operator's determination, it is difficult to keep constant the interval between the near-end alarm and the life terminating alarm. If the operator fails to estimate the interval between the near-end alarm and the life terminating alarm, with the result that the near-end of the life of the component is set too late, then there is a fear that the consumption component reaches the end of life, leading to a trouble in the consumption component. Further, the expected life of the consumption component scatters depending on the component, and hence the actual interval between the estimated near-end and the life termination of the component also scatters. Therefore, the CE shall supply a spare component in a various manner in response to the needs from the actually installed POS terminals, which fact means that the CE shall take flexibly counteraction against the component replacement.

If the operator forgets the correcting and setting operation of the near-end value, the near-end state of the consumption component will be erroneously detected. Thus, the near-end alarm will be generated at an improper timing. Therefore, the timing of the component replacement can become too late with the result that trouble is brought about in the corresponding consumption component or conversely timing of the component replacement can become too early with the result that the component is not effectively utilized.

Accordingly, in the remote monitoring system composed of a number of POS terminals, it is desirable for the near-end value to be automatically set without dependence on the determination of the operator or a manual operation of the operator, whereby interval between the estimated near-end and the life termination of the component is positively kept constant.

SUMMARY OF THE INVENTION

The present invention is made in view of the above aspect. A first object of the present invention is to provide a remote monitoring system composed of an object apparatus and a monitoring apparatus for monitoring the object apparatus in which when the object apparatus is introduced into the system or moved within the system, the function of the reporting unit of the object apparatus is automatically inspected, whereby the object apparatus is smoothly brought into an operation mode and the worker is relieved from a heavy load in maintenance operation. Further, according to the first object of the present invention, the location information of the object apparatus can be positively collected without increasing a load applied to the communication network. Furthermore, according to the first object of the present invention, the location management screen of the monitoring apparatus is automatically updated in accordance with the actual location status of the object apparatus, whereby the manager is relieved from a heavy load in maintenance operation.

A second object of the present invention is to provide an automatic setting apparatus for setting a near-end value for managing a consumption component for use in the remote monitoring system in which a near-end value setting operation for managing the consumption component is automatically carried out without dependence on a determination or manual operation of a worker and/or a manager, whereby the time interval between the near-end and the end of life is positively and properly maintained constant and even if the number of the object apparatus is increased, it is possible to monitor all object apparatus without increasing a load on the worker and/or manager and the consumption component can be replaced with new one at a proper timing effectively.

According to the present invention, in order to attain the above object, there is provided a remote monitoring system composed of an object apparatus to be monitored, and a monitoring apparatus, installed remotely from the object apparatus in the system, for monitoring a current state of the object apparatus over a communication network, wherein the object apparatus includes a state information reporting unit for reporting information about the current state of the object apparatus via the communication network, and a test data generating unit, responsive to start-up of the object apparatus when the object apparatus is introduced into or moved within the system, for generating test data and rendering the state information reporting unit to dispatch the test data to the monitoring apparatus via the communications network.

The monitoring apparatus includes a test data returning unit for returning the test data, which has been received from the object apparatus via the communications network, back to the object apparatus via the communications network so that the test data generating unit of the object apparatus compares the returned test data with the original test data to discriminate whether the state information reporting unit is in condition for normal reporting.

At this time, the test data to be generated by the test data generating unit includes inherent information of the object apparatus, and location information about is a location where introduction, movement or removal of the object apparatus has taken place, the location information being attached to the test data before the test data is dispatched to the monitoring apparatus.

The monitoring apparatus may further includes an extracting unit for extracting the inherent information and the location information, out of the test data that has been received from the object apparatus via the communications network, as introduction information, movement information or removal information of the object apparatus, a location information storage section for storing the introduction information, the movement information or the removal information extracted by the extracting unit, and a location information managing unit for managing the introduction information, the movement information or the removal information stored in the location information storage section.

The remote monitoring system may further comprise a relaying apparatus for relaying the test data from the object apparatus to the communications network, the relaying apparatus having a location information attaching unit for attaching the location information to the test data before the test data is forwarded to the communications network for dispatching to the monitoring apparatus.

The object apparatus may further include an operation unit for inputting both a start instruction to start up the test data generating unit and inherent information of the object apparatus, when the object apparatus is introduced or moved.

The operation unit of the object apparatus may be arranged to have a discrimination notifying function for notifying an operator of the object apparatus of the result of discrimination by the test data generating unit as to whether the state information reporting unit is in condition for normal reporting.

The location information managing unit of the monitoring apparatus may be arranged to have a display section for displaying a state of installation of the object apparatus based on the introduction information, the movement information or the removal information, as a location management screen.

The location information managing unit of the monitoring apparatus may be arranged to have a location change updating unit for dynamically updating the location management screen displayed on the display unit in accordance with the introduction information, the movement information or the removal information.

In this case, the location information managing unit of the monitoring apparatus may be arranged to have a pooled information display unit for displaying, in addition to the location management screen, a pooled information screen showing the introduction information, the movement information or the removal information of the object apparatus, in order for notifying an operator of the monitoring apparatus that the introduction, movement or removal of the object apparatus has been taken place, before the location management screen is updated in accordance with the introduction information, the movement information or the removal information by the location change updating unit. Further, the location change updating unit may be arranged to update the location management screen of the display unit in accordance with the introduction information, the movement information or the removal information as selected or designated on the pooled information screen.

In addition, the location change updating unit may be arranged to display, in the location management screen, a state of installation of the object apparatus, which is related with the introduction information, the movement information or the removal information, in a fashion other than that in which the state of installation of the object apparatus has currently been displayed in the location management screen, before updating of the location management screen in accordance with the introduction information, the movement information and the removal information is executed.

Further, the location change updating unit may be arranged such that, if introduction information, movement information or removal information having the same inherent information as that of the object apparatus which inherent information is contained in the introduction information, the movement information or the removal information before the location management screen is updated with respect thereto is stored in the location information storing unit, judges that the object apparatus having the inherent information has been moved, and deletes the display of the original location of the object apparatus on the location management screen to update the location management screen with respect to the state of movement of the object apparatus.

At this time, the location change updating unit may be arranged to display, on the location management screen, a schedule for removal of the object apparatus from its original location of movement, before deleting on the location management screen the display relating to the object apparatus at the original location of movement.

According to the above remote monitoring system, the object apparatus may be a point of sales (POS) terminal.

Further, the object apparatus may be a point of sales (POS) terminal installed in each of a plurality of stores, and the relaying apparatus may play as a store server installed in each of the plural stores, and the store server is operable to add, to the test data, store information relating to the location of introduction, movement or removal of the object apparatus.

According to the present invention, there is also provided am automatic setting apparatus for use in a remote monitoring system including an object apparatus to be monitored and a monitoring apparatus installed remotely from the object apparatus in the system to monitor a current state of the object apparatus over a communications network, and for automatically setting a near-end value, which is to be used for management of consumption components and to be compared with an amount of actual spending of a consumption component of the object apparatus, to discriminate whether the consumption component has come close to the end of its expected life. The setting apparatus comprises an actual spending calculating unit for calculating the amount of actual spending of the consumption component per unit time, a comparing unit for comparing the calculated amount of actual spending of the consumption component with a predetermined reference amount of spending, and a near-end value setting unit for adjustably setting the near-end value in accordance with the result of comparison made by the comparing unit, in such a manner that a predetermined allowance is provided between a time point when the consumption component is detected to have come close to the end of its expected life and a time point when the consumption component reaches the end of the life.

At this time, as the result of comparison made by the comparing unit, if a difference between the amount of actual spending of the consumption component and the predetermined reference amount of spending is larger than is a predetermined amount and also if the amount of actual spending is larger than the predetermined reference amount of spending, the near-end value setting unit adjustably sets the near-end value as smaller than the then-current value, and if the difference between amount of actual spending of the consumption component and the predetermined reference amount of spending is larger than the predetermined amount and also if the amount of actual spending is smaller than the predetermined reference amount of spending, the near-end value setting unit adjustably sets the near-end value as larger than the then-current value.

The automatic near-end value setting apparatus may comprise an alarm message generating unit arranged such that, after the consumption component has been detected to have come close to the end of its expected life and as the result of comparison by the comparing unit, if a difference between the amount of actual spending of the consumption component and the predetermined reference amount of spending is larger than a predetermined amount and also if the amount of actual spending is larger than the predetermined reference amount of spending, the alarm message generating unit generates an alarm message.

The actual spending calculating unit, the comparing unit and the near-end value setting unit may be provided in the object apparatus. Further, the actual spending calculating unit, the comparing unit and the near-end value setting unit may be provided in the monitoring apparatus, and the actual spending calculating unit is operable to calculate the amount of actual spending of the consumption component per unit time based on actual-spending information about how much the consumption component has been spent, the actual-spending information being reported from the object apparatus to the monitoring apparatus via the communications network. Furthermore, the object apparatus may be a point of sales (POS) terminal.

Further, according to the present invention, there is provided a computer-readable recording medium for use in a remote monitoring system including an object apparatus to be monitored and a monitoring apparatus installed remotely from the object apparatus in the system to monitor a current state of the object apparatus over a communications network. The recording medium has recorded therein a program for automatically setting a near-end value, which is to be used for management of consumption components and to be compared with an amount of actual spending of a consumption component of the object apparatus, to discriminate whether the consumption component has come close to the end of its expected life. The program controls a computer to function as an actual spending calculating unit for calculating the amount of actual spending of the consumption component per unit time, a comparing unit for comparing the calculated amount of actual spending of the consumption component with a predetermined reference amount of spending, and a near-end value setting unit for adjustably setting the near-end value in accordance with the result of comparison made by the comparing unit, in such a manner that a predetermined allowance is provided between a time point when the consumption component is detected to have come close to the end of its expected life and a time point when the consumption component reaches the end of the life.

The recording medium may be arranged such that, when the computer functions as the comparing unit and as the result of comparison made by the comparing unit, if a difference between the amount of actual spending of the consumption component and the predetermined reference amount of spending is larger than a predetermined amount and also if the amount of actual spending is larger than the predetermined reference amount of spending, the near-end value setting unit adjustably sets the near-end value as smaller than the then-current value, and if the difference between amount of actual spending of the consumption component and the predetermined reference amount of spending is larger than the predetermined amount and also if the amount of actual spending is smaller than the predetermined reference amount of spending, the near-end value setting unit adjustably sets the near-end value as larger than the then-current value.

The recording medium may be arranged such that, when the program controls the computer to function as an alarm message generating unit, after the consumption component has been detected to have come close to the end of its expected life and as the result of comparison by the comparing unit, if a difference between the amount of actual spending of the consumption component and the predetermined reference amount of spending is larger than a predetermined amount and also if the amount of actual spending is larger than the predetermined reference amount of spending, the alarm message generating unit generates an alarm message.

According to the remote monitoring system of the present invention, when the object apparatus is introduced into the system or the apparatus is moved within the system, the test data generating unit of the object apparatus generates test data, and the test data is sent by the state information reporting unit to the monitoring apparatus. Thereafter, the test data returning unit of the monitoring apparatus returns the test data to the object apparatus by way of the communication network. Then, the test data generating unit of the object apparatus compares the original test data generated with the test data returned from the monitoring apparatus, so that it is checked whether the state information reporting unit functions well or not in its reporting function.

Therefore, when the object apparatus is introduced into the system or the same is moved within the system, it is possible to automatically carry out not only a general network check, or confirmation whether the object apparatus is physically connected to the network or not, but also confirmation whether a message transmission is positively carried out from the state information reporting unit of the object apparatus to the monitoring apparatus. Accordingly, the object apparatus can be smoothly brought into an operation mode and the worker such as a CE can be remarkably relieved from a load of maintenance operation.

According to the remote monitoring system of the present invention, when the test data is sent from the object apparatus to the monitoring apparatus, the test data is arranged to contain the inherent information of the object apparatus and location information about a location where introduction, movement or removal of the object apparatus. Therefore, the monitoring apparatus can collect the status information of the location each time the object apparatus is introduced into the system, moved within the system and removed from the system without transmitting a packet or the like periodically on the communication network. That is, it is possible for the monitoring apparatus to collect positively the status information of the location of the object apparatus without imposing a heavy load on the communication network.

Further, according to the present invention, when the object apparatus is introduced into the system or moved within the system, the test data generating unit is started up in response to the start instruction input by the operator through the operation unit. In addition, the inherent information of the object apparatus is also input by the operator through the operation unit. Then, the check result of the reporting function of the state information reporting unit done by the test data generating unit is reported to the operator by means of the reporting function. Therefore, the operator on the duty of the introduction, the movement or the removal of the object apparatus can check extremely positively and easily the reporting function of the state information reporting unit.

Furthermore, according to the present invention, the display unit of the monitoring apparatus is arranged to display the location management screen representing the status of the installation of the object apparatus based on the introduction information, the movement information or the removal information of the object apparatus. Further, the location management screen is updated automatically in accordance with the introduction, the movement or the removal of the object apparatus each time the system is supplied with the information concerning the introduction, the movement or the removal of the object apparatus. Therefore, the manager of the system need not update the location management screen in accordance with unauthorized information concerning the introduction, the movement or the removal of the object apparatus. Accordingly, the number of steps for maintaining the location management screen is decreased and the manager of the system can be relieved from a load for maintaining the system.

In this case, before the location management screen is updated in accordance with the introduction information, the movement information or the removal information of the object apparatus, the pooled information screen containing the introduction information, the movement information or the removal information of the object apparatus is displayed so as to inform the manager of that the object apparatus is introduced, moved or removed, whereby the location management screen can be selectively updated in accordance with the introduction information, the movement information of the object apparatus which is selected or designated by the manager with confirmation on the pooled information screen. Therefore, the manager can manage the status of the installation of the object apparatus by means of the location management screen while confirming the location status deriving from the introduction, the movement or the removal of the object apparatus.

In addition, before the updating operation which is going to be carried out is settled on the location management screen based on the introduction information, movement information or the removal information of the object apparatus, the location management screen is formed so that an indication of the object apparatus corresponding to a location status which is going to be updated based on the introduction information, the movement information or the removal information is displayed in a manner different from a manner in which an indication of the same corresponding to a location status last updated is displayed. Therefore, the manager can positively recognize the location status deriving from the introduction, the movement or the removal of the object apparatus.

Further, according to the present invention, if introduction information, movement information or removal information having the same inherent information as that of the object apparatus in which inherent information is contained in the introduction information, the movement information or the removal information before the location management screen is updated with respect thereto is stored in the location information storing unit, the location change updating unit judges that the object apparatus having the inherent information has been moved, and deletes the display of the original location of the object apparatus on the location management screen to update the location management screen with respect to the state of movement of the object apparatus. Therefore, the display of the original location of the object apparatus will not be left undeleted, and the location management screen is automatically updated in accordance with the current location status of the object apparatus without dependence on the manual operation of the manager. Accordingly, the load imposed on the manager will be remarkably reduced. At this time, before the display of the original location of the object apparatus is deleted from the location management screen, the location change updating unit displays, on the location management screen, a schedule for removal of the object apparatus. Thus, the manager can positively recognize which object apparatus is going to be moved or removed.

On the other hand, according to the automatic setting apparatus for setting the near-end value for managing a consumption component employed in the remote monitoring system of the present invention, and also according to the recording medium readable by a computer and having the automatic setting program recorded thereon, the actual spending rate calculating unit calculates the amount of actual spending of the consumption component per unit time, the comparing unit compares the calculated amount of actual spending of the consumption component with a predetermined reference amount of spending, and the near-end value setting unit adjustably sets the near-end value in accordance with the result of comparison so that a predetermined allowance is provided between a time point of the near-end and a time point of the end of the life. Therefore, the near-end value can be automatically set without dependence on the determination or manual operation of the operator and/or manager. Furthermore, the allowance between the time point of the near-end and the time point of the end of the life can be positively maintained constant.

Accordingly, even if the number of object apparatus is increased, all object apparatus can be positively monitored without imposing a load on the operator such as a CE or the manager. Further, the consumption component can be exchanged efficiently at a proper timing, that is, the consumption component can be positively replaced with new one before the component is worn out to cause a trouble, and the consumption component can be prevented from being exchanged too early, with the result that the consumption component can be effectively utilized.

Furthermore, after the near-end state is detected, if it is found that the amount of actual spending per unit time of the consumption component is abruptly increased, the manager can be informed of the fact by the alarm message. Therefore, the manager can be aware that little allowance is left from the near-end state to the life terminating state. Therefore, if the consumption component is replaced with a new one a little earlier, it is possible to prevent the consumption component from being brought to the worn-out stage due to the erroneous estimation of the life of the component.

BRIEF DESCRIPTION OF THE DRAWINGS

FIG. 9 is a diagram showing an example of displayed image of the pooled information screen according to one embodiment of the present invention;

DESCRIPTION OF THE PREFERRED EMBODIMENTS

Embodiments of the present invention will hereinafter be described with reference to the attached drawings.

Figure 2:
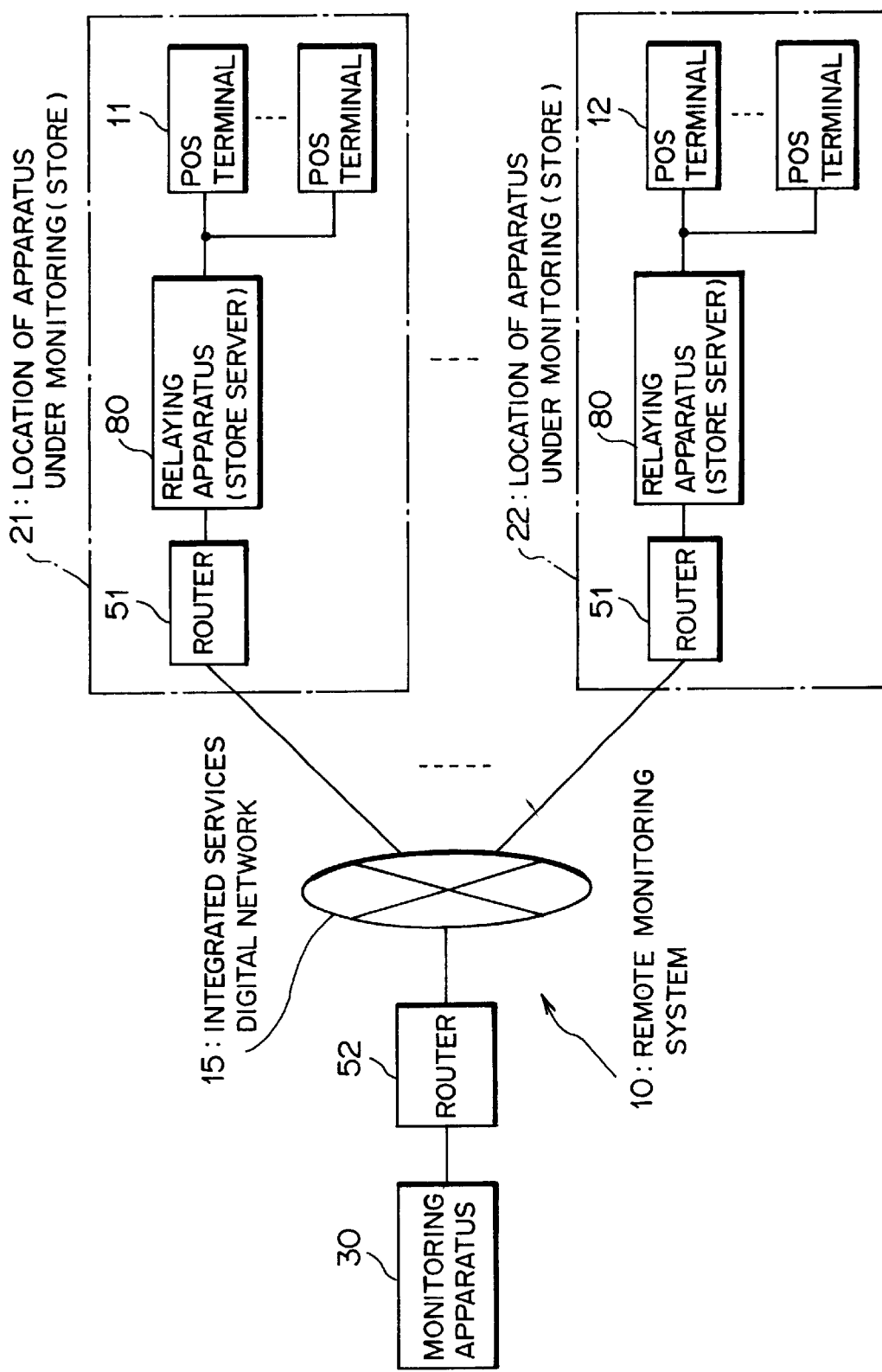
FIG. 2 is a block diagram showing an overall arrangement of the remote monitoring system according to one embodiment of the present invention.

Initially, an overall arrangement of a remote monitoring system according to one embodiment of the present invention will be described. FIG. 2 is a diagram showing an overall arrangement of the remote monitoring system. As shown in FIG. 2, the remote monitoring system 10 of the present embodiment includes a plurality of POS terminals (terminal apparatus, object apparatus) 11, 12 provided in a plurality of stores (locations 21, 22), respectively, and a monitoring apparatus for monitoring the POS terminals 11, 12 by way of an ISDN network (communication network) 15.

The plurality of POS terminals 11, 12 provided in the plurality of locations 21, 22 are connected to the ISDN network 15 through a relaying apparatus (store server) 80 and a router 51. The monitoring apparatus 30 is also connected to the ISDN network 15 through a router 52. Thus, each of the POS terminals 11, 12 and the monitoring apparatus 30 are arranged to communicate with each other by way of the relaying apparatus 80, the router 51 and 52 and the ISDN network 15.

Figure 1:
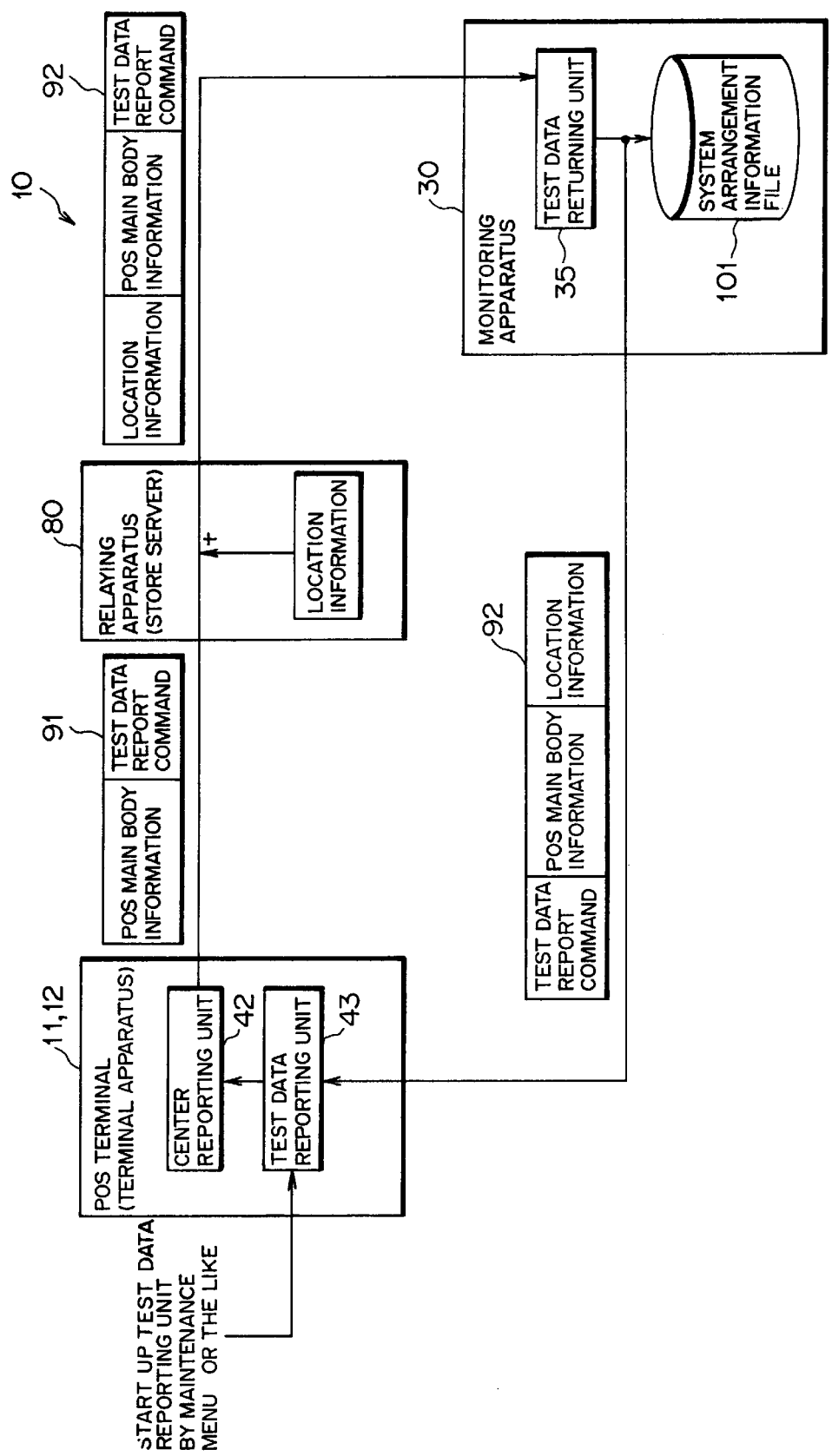
FIG. 1 is a block diagram useful for explaining a fundamental arrangement and the operation principle of a test data reporting function of a remote monitoring system as one embodiment of the present invention.

Now, a fundamental arrangement and operation principle of the test data reporting operation of the remote monitoring system 10 of the present embodiment will be described with reference to FIG. 1. As shown in FIG. 1, each of the POS terminals 11, 12 is arranged to include a center reporting unit 42 and a test data reporting unit 43.

The center reporting unit (state information reporting unit) 42 serves as a reporting unit for reporting state information (actually, information concerning a consumption component) of each of the POS terminals 11, 12 to the monitoring apparatus 30 by way of the ISDN network 15 (see FIG. 2).

The test data reporting unit (test data generating unit) 43 is arranged to be started up when each POS terminal 11, 12 is introduced into the system, moved within the system, generate test data, and render the center reporting unit 42 to dispatch the as a test data reporting packet 91 to the monitoring apparatus 30. Further, the test data reporting unit 43 compares the original test data generated by the test data reporting unit 43 with test data (test data reporting packet 92) returned from the monitoring apparatus 30 as described later, whereby the test data reporting unit 43 discriminate whether the reporting function of the center reporting unit 42 is in condition for normal reporting.

The test data (test data reporting packet 91) is arranged to include test report command as well as POS main body information which is inherent information of each POS terminal and information concerning the date and time when the POS terminal is introduced into the system, moved within the system or removed from the system. When each POS terminal 11, 12 is introduced into the system or moved within the system, an operator such as CE or the like inputs the POS main body information through a display console panel 44 (see FIG. 3).

The relaying apparatus 80 is provided at each store as described above with reference to FIG. 2, and it manages line concentration of test data report (state information report) and information indicative of a place where the POS terminals 11, 12 are provided. The information represents a location into which the POS terminals 11, 12 are introduced, from which and to which the POS terminals are moved, and from which the POS terminals 11, 12 are removed. Therefore, the information serves as location information (system arrangement information) of the present invention. The relaying apparatus 80 adds the location information to the test data reporting packet 91 transmitted from the test data reporting unit 43 through the center reporting unit 42. Further, the relaying apparatus 80 transmits a test data reporting packet 92 deriving from the test data reporting packet 91 added with the location information to the monitoring apparatus 30.

The monitoring apparatus 30 is arranged to include a test data returning unit 35 and a location information file 101.

The test data returning unit 35 returns the test data (test data reporting packet 92), which has been received from the POS terminals 11, 12 by way of the ISDN network 15, back to each POS terminal 11, 12 by way of the ISDN network 15. Further, the location information file (location information storage section) 101 is utilized for storing therein the location information (concerning introduction, movement or removal) of each POS terminal 11, 12 obtained through the test data (test data reporting packet 92) so as to correspond to the information of the main body of each POS terminal 11, 12.

Now, the operation principle (test data reporting or location collection) of the remote monitoring system 10 shown in FIG. 1 will be described.

Each of the POS terminals 11, 12 has a maintenance menu for starting up the test data reporting unit 43. When each POS terminal 11, 12 is introduced into the system or moved within the system, an operator such as a CE or the like issues a test data reporting command from the maintenance menu. When the command is generated, the test data created by the test data reporting unit 43 is transmitted from the center reporting unit 42 to the relaying apparatus 80 as the test data reporting packet 91. The relaying apparatus 80 adds the location information to the test data reporting packet 91 transmitted from the test data reporting unit 43 and transmits the resulting test data reporting packet 92 to the monitoring apparatus 30.

When the location information of each POS terminal 11, 12 obtained from the received test data reporting packet 92 is stored in the location information file 101 in the monitoring apparatus 30 so as to correspond to each of the POS terminals 11, 12, then the system can collect the location information of each POS terminal 11, 12 (location information). After the test data reporting packet 92 is stored in the location information file 101, if it is determined by the monitoring apparatus 30 that the test data reporting packet 92 is normally received, then the test data returning unit 35 returns the test data reporting packet 92 to the test data reporting unit 43 of the corresponding POS terminal 11, 12.

When the test data reporting unit 43 receives the test data reporting packet 92 from the monitoring apparatus 30, the test data reporting unit 43 compares the POS main body information within the test data reporting packet 92 with the POS main body information upon creation of the test data reporting packet 91, whereby the reporting function of the center reporting unit 42 is checked. That is, if it is confirmed that both of the POS main body information are coincident to each other, then it is determined that the test data reporting has been successfully done (the center reporting unit 42 is condition for normal reporting), while if it is confirmed that both of the POS main body information are not coincident to each other, then it is determined that the test data reporting has not been successfully done.

Then, the result of the check operation is displayed on a display unit mounted on each POS terminal 11, 12 together with some message representing that the test data reporting has been done. The result of the check operation and the message may be printed by a printer. Thus, the operator of the system is informed of the result of the check operation and the accompanying message. According to one mode of the present invention, the message containing the check result is displayed on the display/console panel 44 (see FIG. 3) of each POS terminal 11, 12 as, for example, shown in FIG. 8.

Figure 3:
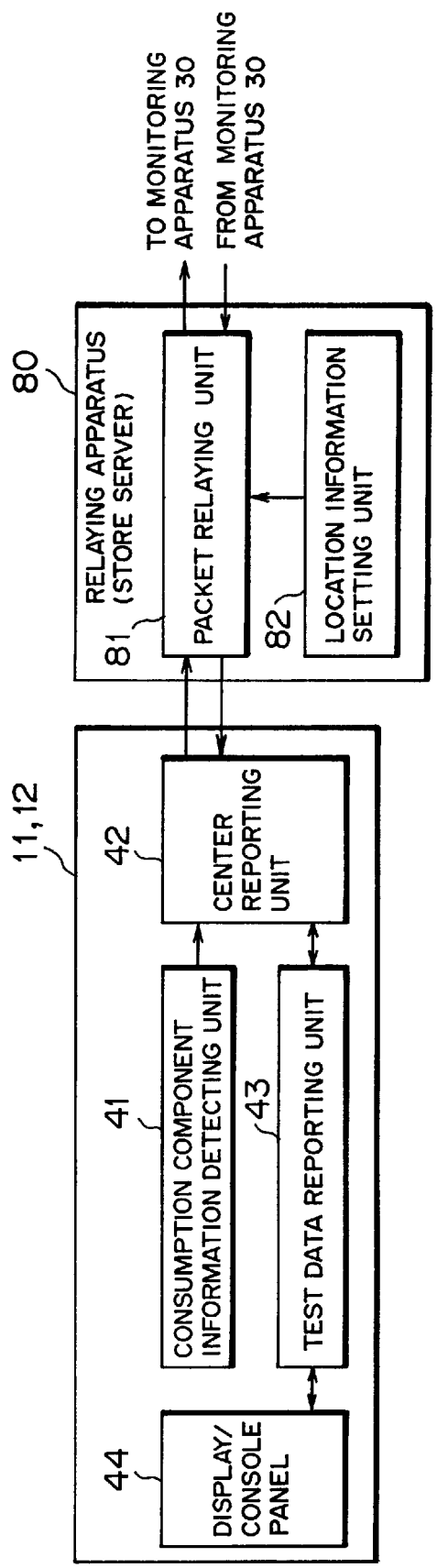
FIG. 3 is a block diagram showing an arrangement of a POS terminal and a relaying apparatus according to one embodiment of the present invention.
Figure 4:
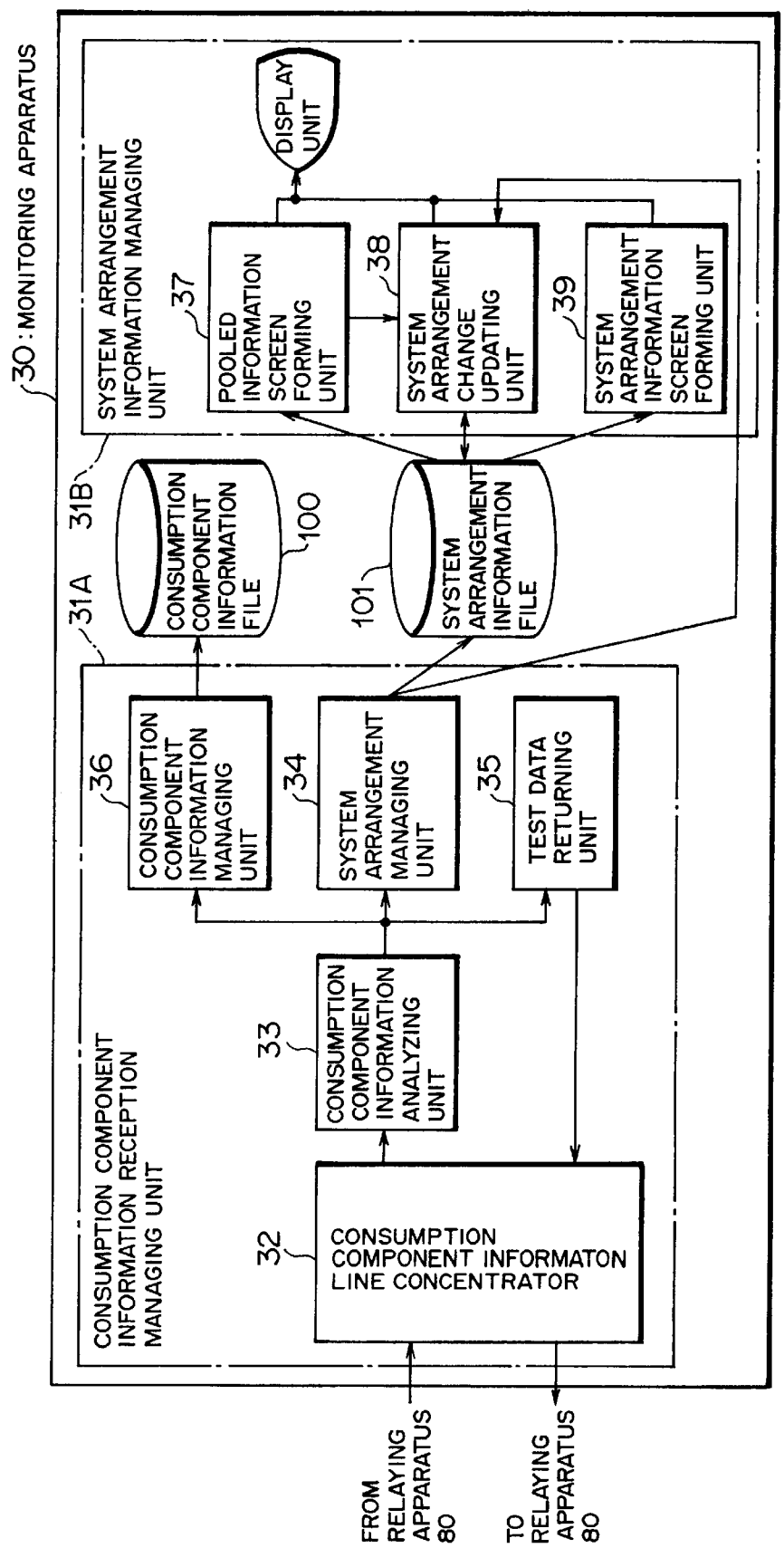
FIG. 4 is a block diagram showing an arrangement of a monitoring apparatus according to one embodiment of the present invention.

Next, the arrangement of the remote monitoring system 10 of the present embodiment will be described in more detail with reference to FIGS. 3 and 4. FIG. 3 is a block diagram showing an arrangement of the POS terminal 11, 12 and the relaying apparatus 80 and FIG. 4 is a block diagram showing an arrangement of the monitoring apparatus 30.

As shown in FIG. 3, each of the POS terminals 11, 12 has a consumption component information detecting unit 41, the center reporting unit 42, the test data reporting unit 43 and the display/console panel 44.

Figure 5:
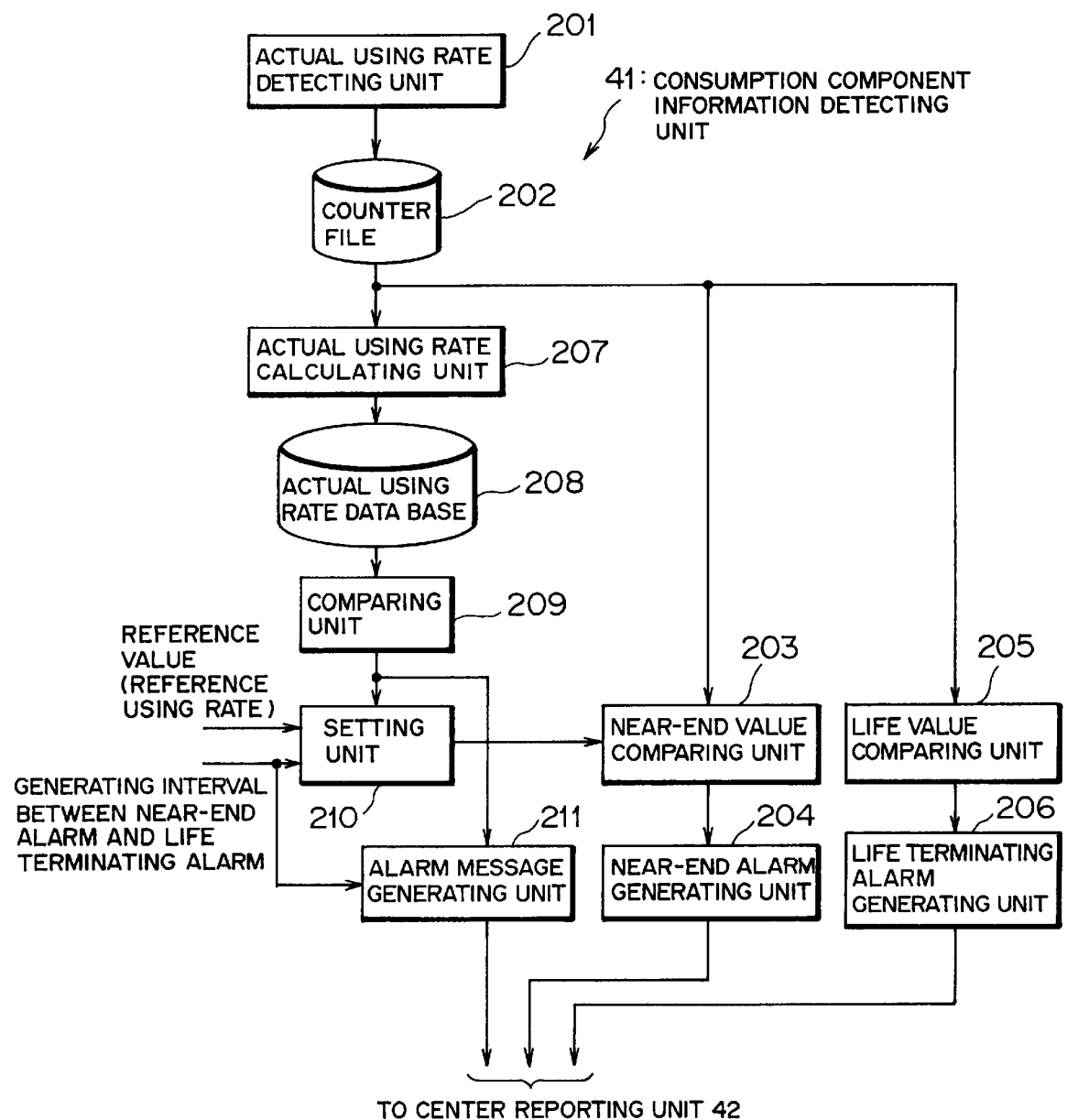
FIG. 5 is a block diagram showing an arrangement of a consumption component information detecting unit provided in the POS terminal according to one embodiment of the present invention.

The consumption component information detecting unit 41 is arranged as shown in FIG. 5, and includes a function of detecting the using condition (spending condition), or data of duty time accumulated so far, of the consumption component (such as a number of typed lines of a thermal printer, display time of a CRT or the like) and a function of generating a near-end alarm or a life terminating alarm in accordance with the detected using condition.

The center reporting unit 42 sends the consumption component information (information concerning the using condition of the consumption component or information concerning the near-end alarm or the life terminating alarm) detected by the consumption component information detecting unit 41 to the monitoring apparatus 30 by way of the ISDN network 15 (see FIG. 2). Further, as has been described with reference to FIG. 1, the center reporting unit 42 sends the test data from the test data reporting unit 43 (the test data reporting packet 91) to the monitoring apparatus 30 by way of the ISDN network 15 (see FIG. 2) The center reporting unit 42 also has a function of receiving the test data returning packet (the test data reporting packet 92) from the relaying apparatus 80, and sends the same to the test data reporting unit 43.

The test data reporting unit 43 has the functions described with reference to FIG. 1, and therefore, they will not be described in detail.

As has been described with reference to FIG. 1, the display/console panel (operation unit) 44 is a device useful for inputting an energizing command for energizing the test data reporting mechanism 43 and inherent information (POS main body information) of each POS terminal 11, 12. The display/console panel 44 also serves as a display unit as an informing function informing the operator of the system of the check result made by the test data reporting unit 43. An actual implementation of the display/console panel 44 will be described later with reference to FIG. 8.

The relaying apparatus 80 has the function described with reference to FIG. 1, and is arranged to include a packet relaying unit 81 and a location information setting unit 82.

The packet relaying unit 81 controls the transmission and reception of a packet that shall be transmitted and received between each POS terminals 11, 12 and the monitoring apparatus 30. The location information setting unit (location information-attaching unit) 82 attaches location information of each POS terminals 11, 12 to the test data reporting packet and the consumption component information received from the POS terminals 11, 12, before the test data reporting packet and the consumption component information are forwarded to the ISDN network 15 for dispatching to the monitoring apparatus 30. The relaying apparatus 80 having the location information setting unit 82 serves as an MAP server making the location of each POS terminal 11, 12 discernible.

On the other hand, the monitoring apparatus 30 of the present embodiment carries out reception management of the consumption component information sent from the POS terminal 11, 12, reception and transmission of the test data report from the POS terminal 11, 12, and management of the location information (location information) of the POS terminal 11, 12. As shown in FIG. 4, the monitoring apparatus 30 is arranged to include the consumption component information file 100 and the location information file 101 and other components. The other components are classified into components included in a consumption component information reception managing unit 31A and components included in a location information managing unit 31B.

The consumption component information reception managing unit 31A receives the consumption component information from each POS terminal 11, 12 and manages the same, and also receives the test data report from the POS terminal 11, 12 and returns the same to the POS terminal 11, 12. In order to carry out the operations, the consumption component information reception managing unit 31A includes a consumption component information line-concentrator 32, a consumption component information analyzing unit 33, a location managing unit 34, a test data returning unit 35 and a consumption component information managing unit 36.

The consumption component information line-concentrator 32 controls transmission and reception of a packet transmitted or received between the relaying apparatus 80 and the monitoring apparatus 30. The consumption component information analyzing unit 33 discriminates the kind of packet (command) received by the consumption component information line-concentrator 32, and distributes the packet to the location managing unit 34, the test data returning unit 35 and the consumption component information managing unit 36 depending on the result of the discrimination.

When the packet received by the consumption component information line-concentrator 32 is a test data reporting packet 92, the location managing unit (extracting unit) 34 extracts the inherent information and the location information of the POS terminal 11, 12 contained in the packet 92, and then stores the location information in the location information file 101 so as to correspond to the inherent information.

The test data returning unit 35 is arranged to have the function described with reference to FIG. 1. When the packet received by the consumption component information line-concentrator 32 is a test data reporting packet 92, the test data returning unit 35 returns the test data reporting packet 92 to the test data reporting unit 43 of the corresponding POS terminal 11, 12 without any modification through the consumption component information line-concentrator 32.

If the packet received by the consumption component information line-concentrator 32 contains the consumption component information, the consumption component information managing unit 36 extracts the consumption component information, and stores the same in the consumption component information file 100.

The location information managing unit (location information managing unit) 31B manages location information (system arrangement information) of the POS terminal 11, 12 stored in the location information file 101, and performs displaying the system arrangement status (location status) of the POS terminals 11, 12 in accordance with the location information. In order to carry out the operations, the location information managing unit 31B is arranged to include a pooled information screen forming unit 37, a system arrangement change updating unit 38, a location information screen forming unit 39 and a display unit 40.

The display state in the display unit 40 is controlled by the pooled information screen forming unit 37, the system arrangement change updating unit 38 and the location information screen forming unit 39, which will be described later on. The display unit 40 serves for displaying a location management screen (location management screen; image representation designated by reference numerals 61 and 161 in FIGS. 6, 7 and 10) representing the location status of the POS terminal 11, 12 and the pooled information screen (image representation designated by reference numerals 111 and 151 in FIGS. 6, 7 and 9), which will be described later on, in accordance with the location information stored in the location information file 101. Thus, the display unit 40 is formed of a CRT or the like.

The location information screen forming unit 39 forms an image representing a POS terminal of which introduction, movement or removal is approved by the manager of the system, in accordance with the location information stored in the location information file 101, and displays the formed image on the display unit 40.

The pooled information screen forming unit (pooled information display unit) 37 forms a pooled information image which derives from a location status corresponding to a version before the manager approves the introduction, movement or removal of the POS terminal, from the location information stored in the location information file 101, and displays the formed pooled information screen on the display unit 40. That is, before the system arrangement change updating unit 38 updates the location management screen in accordance with the introduction, movement or removal of the POS terminal which is approved by the manager, the pooled information screen forming unit 37 makes the display unit 40 display the pooled information screen containing the information concerning the introduction, movement or removal of the POS terminal, separate from the location management screen. Thus, the viewer of the display unit 40 is informed of that the POS terminal 11, 12 is introduced, moved or removed.

The system arrangement change updating unit (location change updating unit) 38 actually updates the location information file 101 in accordance with instruction provided from the pooled information screen forming unit 37 or the location managing unit 34, and also updates dynamically the location management screen displayed on the display unit 40 in accordance with the location information (system arrangement information) containing the information of introduction, movement or removal of the POS terminal, approved by the manager.

The system arrangement change updating unit 38 is arranged to update the location management screen displayed on the display unit 40 in accordance with the information concerning the introduction, movement or removal of the POS terminal which is designated or selected with the pooled information screen, as will be described with reference to FIG. 9.

Further, the system arrangement change updating unit 38 is arranged as follows. That is, before it updates the location management screen in accordance with the information concerning the introduction, movement or removal of the POS terminal which is not approved by the manager, and settles the updated image, the system arrangement change updating unit 38 displays, in the system arrangement management screen (location management screen), a state of installation of the POS terminal 11, 12, which is related with the introduction, movement or removal, in a fashion other than that in which the state of installation of the POS terminal 11, 12 has currently been displayed in the system arrangement management screen (the location management screen already displayed and containing no indication of the introduction, movement or removal of the POS terminal which is not approved by the manager). The fashions of display may be made distinguishable from each other by allocating different blink displays, high and low brightness displays, different concentration of colors or the like to respective indications.

Further, the system arrangement change updating unit 38 is arranged such that, if the information containing the inherent information identical to the inherent information of the POS terminal contained in the information concerning the introduction, movement or removal at a status in which the updating operation has not been carried out on the location management screen, is stored in the location information file 101, then the system arrangement change updating unit 38 judges that the POS terminal having the inherent information is moved. Thereafter, the system arrangement change updating unit 38 deletes the display of the original location of the POS terminal on the system arrangement management screen. Thus, the location management screen is updated in accordance with the status in which the POS terminal has been moved. At this time, as will be described with reference to FIGS. 7 and 10, before the display relating the POS terminal at its original location of movement is deleted from the location management screen, the system arrangement change updating unit 38 displays, on the location management screen, a schedule for removal of the POS terminal from the original location.

Now, an arrangement of a consumption component information detecting unit 41 of the POS terminal 11, 12 of the present embodiment will be described in detail with reference to FIG. 5. The consumption component information detecting unit 41 is a unit containing a function as an automatic setting apparatus for automatically setting a near-end value for managing a consumption component. FIG. 5 is a block diagram showing the arrangement of the consumption component information detecting unit 41. The automatic setting apparatus for setting the near-end value for managing the consumption component is utilized for detecting that the consumption component provided within each POS terminal 11, 12 is coming close to the end of its life as a near-end state. In order to detect the state, the consumption component information detecting unit 41 automatically sets the near-end value to be compared with the using rate of the consumption component.

As shown in FIG. 5, the consumption component information detecting unit 41 is arranged to include an actual using rate detecting unit 201, a counter file 202, a near-end value comparing unit 203, a near-end alarm generating unit 204, a life value comparing unit 205, a life terminating alarm generating unit 206, an actual using rate calculating unit 207, an actual using rate data base 208, a comparing unit 209, a setting unit 210 and an alarm message generating unit 211.

Among the above components, the actual using rate calculating unit 207, the comparing unit 209, the setting unit 210 and the alarm message generating unit 211, which function as the automatic setting apparatus for setting the near-end value for managing the consumption component, are actually implemented by executing an automatic setting program by a computer (not shown) constituting the POS terminal 11, 12. That is, the automatic setting program is recorded in its initial state on a recording medium readable by a computer such as a hard disk, a magnetic tape, a floppy disk, an optical disk a magneto-optical disk, a CD-ROM or the like. The program is brought into an operation mode by installing from the recording medium into the computer. When the near-end value for managing the consumption component is automatically set, the computer reads the automatic setting program and stores the same into a RAM or the like to execute the same, whereby the operation of the computer is made to function as the actual using rate calculating unit 207, the comparing unit 209, the setting unit 210 and the alarm message generating unit 211 of the automatic setting apparatus.

The actual using rate detecting unit 201 detects the using state (spending state) of the consumption component provided within the POS terminal 11, 12 as count data, or data of duty time accumulated so far (e.g., a count of typed line number of a thermal printer, a count of display time of a CRT display). The counter file 202 stores therein the using state information (count data) detected by the actual using rate detecting unit 201 for each consumption component (device).

The near-end value comparing unit 203 compares the count data stored in the counter file 202 with a predetermined near-end value periodically. The near-end alarm generating unit 204 generates a near-end alarm if the result of comparison made by the near-end value comparing unit 203 reveals that the count data reaches the near-end value.

The life value comparing unit 205 compares the count data with the predetermined life value stored in the counter file 202 periodically after the near-end alarm is generated by the near-end alarm generating unit 204.

The life terminating alarm generating unit 206 generates a life terminating alarm if the result of comparison made by the life value comparing unit 205 reveals that the count data reaches the life value.

The near-end alarm or the life terminating alarm are sent to center reporting unit 42 as consumption component information, and then reported from the center reporting unit 42 to the monitoring apparatus 30 through the relaying apparatus 80 and the ISDN network 15.

The actual using rate calculating unit (actual spending calculation unit) 207 calculates the actual using rate (the amount of actual spending) of the consumption component per unit time (e.g., a day) based on the count data stored in the counter file 202.

The actual using rate data base 208 is utilized for storing therein the actual using rate of the consumption component per unit time calculated by the actual using rate calculating unit 207 for each consumption component (device).

The comparing unit 209 reads the actual using rate of the consumption component per unit time from the actual using rate data base 208 and compares the actual using rate with a predetermined reference using rate (a predetermined reference amount of spending; reverence value).

The setting unit 210 automatically sets the near-end value utilized by the near-end value comparing unit 203 so that a predetermined interval is provided between the timing point when the near-end alarm is generated and the timing point when the life terminating alarm is generated (i.e. in such a fashion that a predetermined allowance is provided between a time point when the consumption component is detected to have come close to the end of its expected life and a time point when the consumption component reaches the end of the life), in accordance with the result of comparison made by the comparing unit 209. The setting unit 210 is operated as follows. If it is revealed from the comparison made by the comparing unit 209 that the actual using rate per unit time of the consumption component exceeds 110% of the reference value, for example, then the setting unit 210 replaces the current near-end value with a smaller one. On the other hand, if it is revealed from the comparison made by the comparing unit 209 that the actual using rate of the consumption component stays below 90% of the reference value, then the setting unit 210 replaces the current near-end value with a larger one.

After the near-end alarm is generated, if it is revealed from the comparison made by the comparing unit 209 that the actual using rate of the consumption component per unit time exceeds 110% of the reference value, the alarm message generating unit 211 calculates the remaining life span (time left to the timing of life terminating alarm) of the consumption component, and generates an alarm message containing the result of calculation. The alarm message is also sent to the center reporting unit 42 as consumption component information, and further reported from the center reporting unit 42 to the monitoring apparatus 30 by way of the relaying apparatus 80 and the ISDN network 15.

According to the embodiment of the present invention, description has been made on a case in which the counter file 202, the near-end value comparing unit 203, the near-end alarm generating unit 204, the life value comparing unit 205, the life terminating alarm generating unit 206, the actual using rate calculating unit 207, the actual using rate data base 208, the comparing unit 209 the setting unit 210 and the alarm message generating unit 211 are provided on the side of the POS terminal 11, 12.

However, these components 202 to 211 may be provided on the side of the monitoring apparatus 30. Even if these components are so arranged, the same operation may be carried out based on the using state information of the consumption component reported from the POS terminal 11, 12 by way of the ISDN network 15.

Operation of the remote monitoring system 10 arranged as described above will hereinafter be described.

Also in the remote monitoring system 10 of the present embodiment, an event (consumption component information) occurring in each of the POS terminals 11, 12 is reported to the monitoring apparatus 30 by way of the ISDN network 15 and the event is received by the monitoring apparatus, with the result that the operator of the system can monitor the state of the POS terminals.

Figure 8:
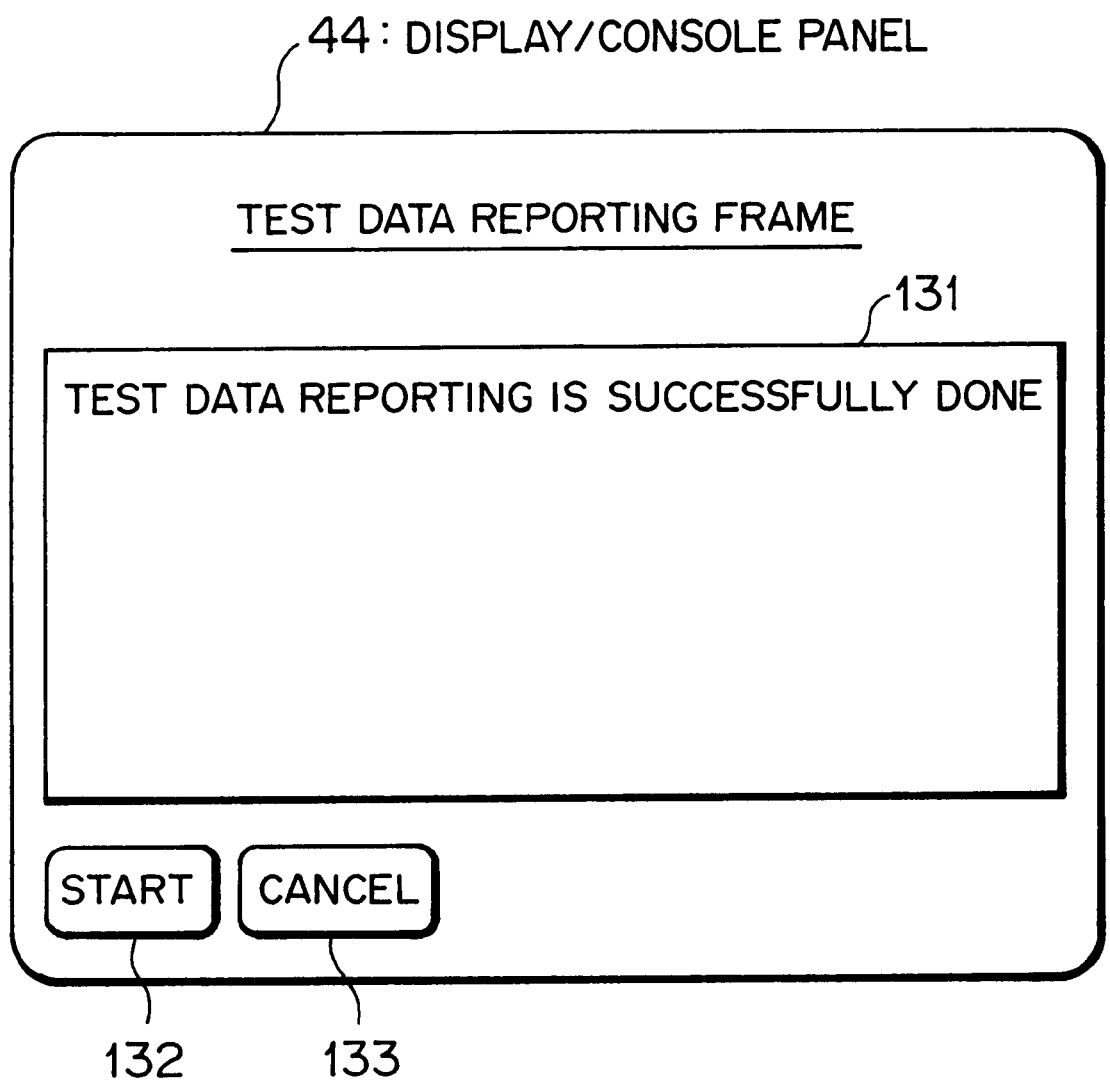
FIG. 8 is a diagram showing a display/console panel (display type) employed in one embodiment of the present invention.

When the POS terminal 11, 12 is introduced into the system or moved within the system, a display/console panel 44 of a display type of the POS terminal 11, 12 displays thereon an image representing the test data report as shown in FIG. 8. The display screen formed on the display/console panel 44 includes a check result display area 131, a start button 132 for starting up the test data reporting unit 43 and a cancel button 133 for terminating he display screen.

Now description will be made on a case where test data report is carried out by using the display/console panel 44 of the POS terminal 11.

Initially, an operator (CE or the like) of the POS terminal 11 depresses the start button 132 of the display/console panel 44 to input a test data report energizing command to the test data reporting unit 43. When the test data reporting unit 43 is started up in response to the command, the test data reporting unit 43 creates the test data reporting packet 91 (see FIG. 1) containing a test data reporting command or POS main body information (information obtained by the operator). Then, the test data reporting unit 43 requests the center reporting unit 42 to transmit the test data reporting packet 41. The center reporting unit 42 transmits the packet 91 to the relaying apparatus 80.

The relaying apparatus 80 receives the packet 91 transmitted from the POS terminal 11 with the packet relaying unit 81. Then, the relaying apparatus 80 adds location information (store information) of the POS terminal 11 to the packet 91 by a location information setting unit 83, and transmits the resulting packet 92 (see FIG. 1) to the monitoring apparatus 30.

When the monitoring apparatus 30 receives the packet by means of a consumption component information line-concentrator 32, then the packet is transferred to a consumption component information analyzing unit 33. The consumption component information analyzing unit 33 carries out analysis on the command with reference to the contents of the packet, and distributes the packet to a location managing unit 34, a test data returning unit 35 and a consumption component information managing unit 36, depending on the result of the analysis.

When the consumption component information analyzing unit 33 receives the test data reporting packet 92, the consumption component information analyzing unit 33 initially transfers the packet 92 to the consumption component information managing unit 36. The test data returning unit 35 returns the packet 92 without effecting any modification to the test data reporting unit 43 of the POS terminal 11 by way of the consumption component information line-concentrator 32 and the relaying apparatus 80.

When the POS terminal 11 receives the packet, the test data reporting unit 43 compares the packet 92 returned from the monitoring apparatus 30 with the packet 91 at a version of creating the packet 91. If it is determined that both of the packets are coincident to each other, as shown in FIG. 8, that the test data report is successfully done is displayed on the check result display area 131 of the display/console panel 44. If it is determined that the packets are not coincident to each other or the test data reporting packet 92 cannot be received for a predetermined time duration, a message stating that the test data report is failed is displayed on the check result display area 131. In this way, the reporting function of the center reporting unit 42 is checked, and the result thereof is informed to the operator of the system by means of the display/console panel 44.

After the consumption component information analyzing unit 33 transfers the test data reporting packet 92 to the test data returning unit 35, the consumption component information analyzing unit 33 then transfers the test data reporting packet 92 to the location managing unit 34. The location managing unit 34 extracts location information contained in the test data reporting packet 92 and stores the location information into the location information file 101 so as to keep correspondence to the inherent information of the POS terminal 11. The location information file 101 always offers reference to the pooled information screen forming unit 37, the system arrangement change updating unit 38 and the location information screen forming unit 39 so that the viewer of the display unit 40 can monitor the status of the location including information concerning introduction, movement or removal of a POS terminal.

Now, the display operation of the location management screen and the pooled information screen will be described with reference to FIGS. 6 and 7. That is, reference is made to FIG. 6 for describing the display operation of the location management screen and the pooled information screen when the POS terminal 12 is introduced into the system while reference is made to FIG. 7 for describing the display operation of the location management screen and the pooled information screen when the POS terminal 12 is moved within the system.

Figure 6:
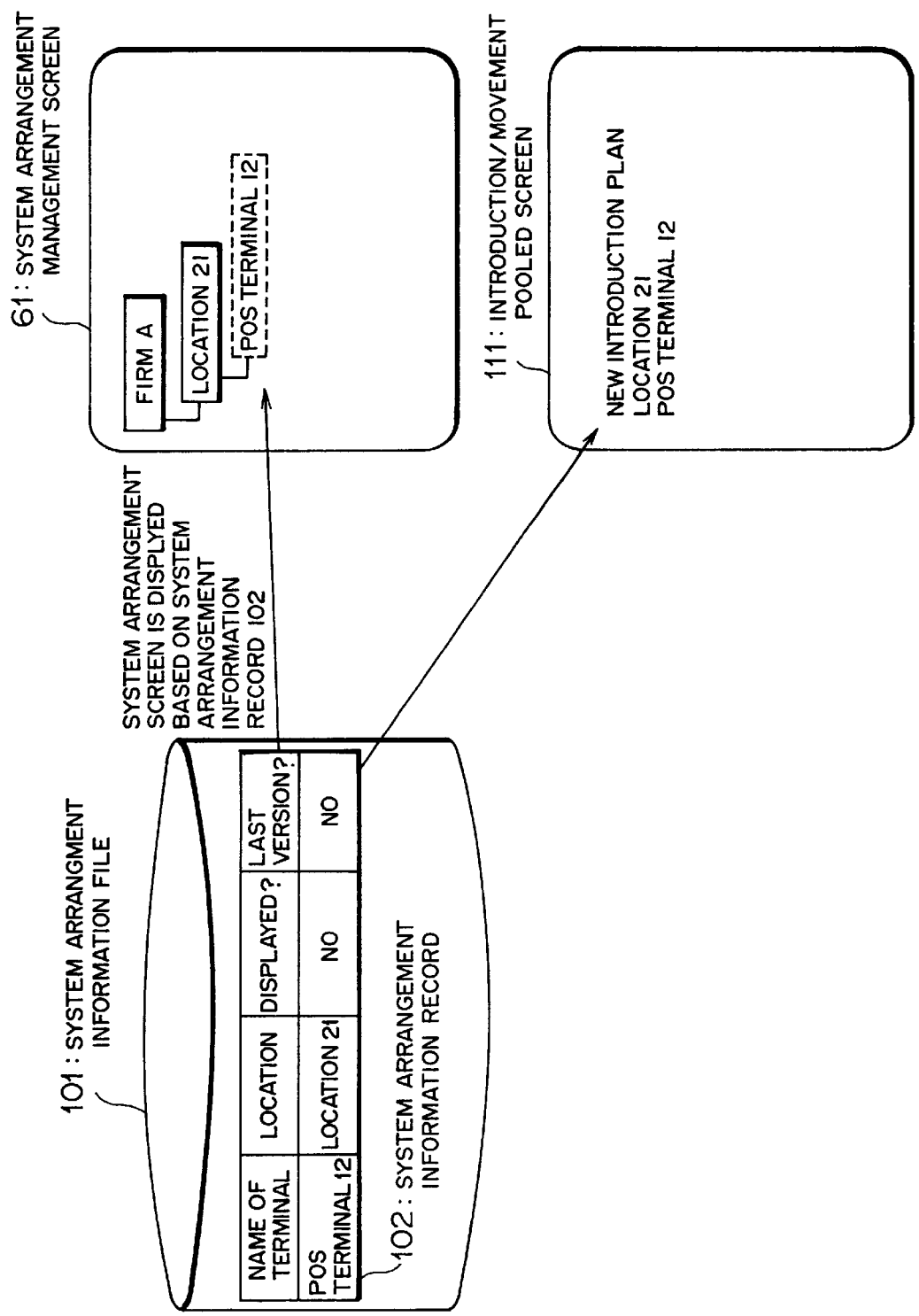
FIG. 6 is a diagram useful for explaining the display operation of a location management screen and a pooled information screen when an object apparatus is introduced into the system according to one embodiment of the present invention.

FIG. 6 is a diagram showing a case where the POS terminal 12 is introduced into the system at the location 21. At this time, the location information screen forming unit 39 forms the location management screen 61 and makes the display unit 40 display the screen so as to contain the status of the arrangement of the POS terminal 12 depending on the reference to the location information file 101.

When the POS terminal 12 is introduced into the system, the test data reporting is carried out between the POS terminal 12 and the monitoring apparatus 30 in the above-described manner. When the monitoring apparatus 30 receives the test data report, the monitoring apparatus 30 extracts location information (location 21) of the POS terminal 12 from the test data reporting packet 92 in the above-described manner. Then, the monitoring apparatus 30 stores the extracted information into the location information file 101 as a location information record 102. As shown in FIG. 6, the location information record 102 is arranged to have an entry item indicating whether the indication corresponding to the POS terminal is displayed or not and an entry item indicating whether the displayed status is the last version or not. These entries are set to be "No" as a default value soon after the location information record 102 is stored in the location information file 101. That is, the entry "No" signifies in this case that no updating operation has not been carried out on the location status in relation to the entry of the location information.

The entry item of "LAST VERSION?" is an item indicating whether the record 102 represents the last updated location status or not. If "Yes" is entered as the entry, which signifies in this case that the updating operation has been carried out on the location status in relation to the entry of the location information.

If the entry of "DISPLAYED?" is "No", the indication of the POS terminal 12 is not displayed in the location management screen 61 but displayed on an introduction/movement pooled screen (pooled information screen) 111. That is, when it is noticed that there is a plan to introduce the POS terminal 12, the indication of the POS terminal 12 is temporary displayed on the introduction/movement pooled screen 111, so that the manager of the system is given a chance for determining whether the new introduction of the POS terminal 12 shall be authorized or not.

At this time, if it is checked whether or not "Yes" is entered in the item of "LAST VERSION?" of the location information file 101 and whether or not there is a record containing an identical terminal name (inherent information of the POS terminal 12), it can be discriminated whether the POS terminal 12 is introduced into the system or moved within the system. If it is determined that the POS terminal 12 is introduced into the system, an indication of the POS terminal 12 is displayed on the location management screen 61 with a light color (in FIG. 6, the indication is represented by a dot line frame), so that the viewer of the screen can recognize the indicated POS terminal 12 is one going to be introduced into the system.

When the manager of the system clicks with a mouse or the like the display area associated with the indication of the POS terminal 12 on the location management screen 61 or the introduction/movement pooled screen 111, the location management screen 61 is updated in accordance with the information of the POS terminal 12 and the resulting location status is settled as a last updated version. In association with the above operation, "Yes" is entered in each of the item of "DISPLAYED?" and "LAST VERSION?" of the location information record 102.

Figure 7:
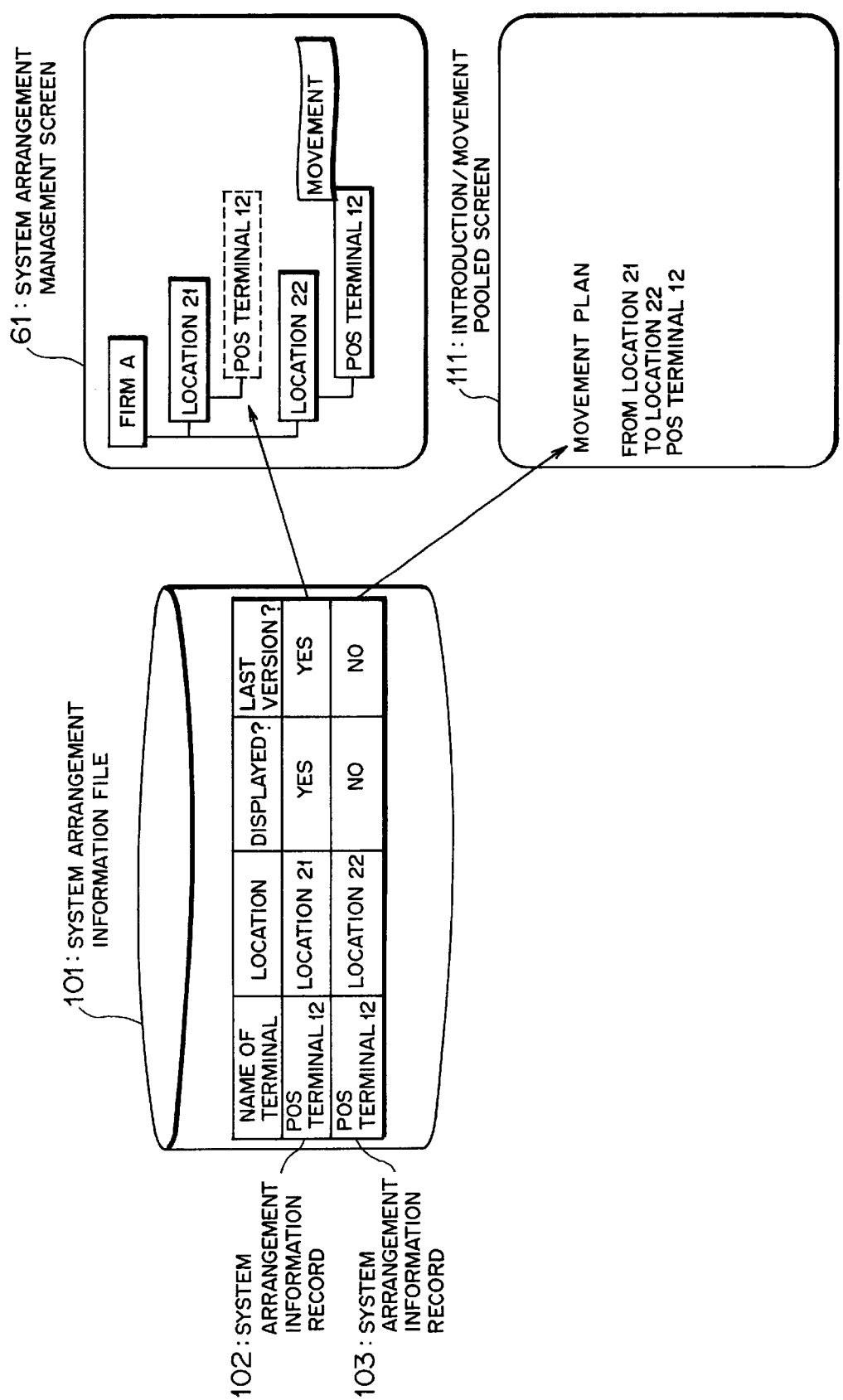
FIG. 7 is a diagram useful for explaining the display operation of a location management screen and a pooled information screen when an object apparatus is moved within the system according to one embodiment of the present invention.

FIG. 7 is a diagram useful for explaining a case where the POS terminal 12 is once introduced into the system at the location 21 and then moved from the location 21 to a location 22.

When the POS terminal 12 is moved from the location 21 to the location 22, the POS terminal carries out the test data reporting to the monitoring apparatus 30 in the above-described manner. When the monitoring apparatus 30 receives the test data report, the monitoring apparatus 30 extracts the location information (information indicative of location 22) about the POS terminal 12 from the test data reporting packet 92 in the above-described manner. Then, the monitoring apparatus 30 stores the information into the location information file 101 as the location information record 103. At this time, "No" is entered in each of the item of "DISPLAYED?" and "LAST VERSION?" of the location information record 103.

If the entry of "DISPLAYED?" is "No", the indication of the POS terminal 12 is not displayed in the location management screen 61 but displayed on an introduction/movement pooled screen (pooled information screen) 111.

At this time, if it is checked whether "Yes" is entered or not in the item of "LAST VERSION?" of the location information file 101 and there is contained a record having an identical terminal name (inherent information of the POS terminal 12) or not, it can be discriminated whether the POS terminal 12 is introduced into the system or moved within the system. If it is determined that the POS terminal 12 is moved within the system, the indication of the POS terminal 12 is indicated at the location 21 (movement source corresponding to the last version of the location status in which the movement is not carried out) with a light color (in FIG. 7, the indication is represented by a dot line frame). This indication of the POS terminal 12 is also displayed at the location 22 (movement destination) together with an indication representing that the POS terminal 12 is moved one.

If the manager of the system clicks with a mouse or the like the display area associated with the indication of the POS terminal 12 on the location management screen 61 or the introduction/movement pooled screen 111, the indication of the POS terminal 12 corresponding to the location 21 is deleted and the indication of the POS terminal 12 corresponding to the location 22 is settled on the location management screen 61. In association with is the above operation, "No" is entered in the item of "DISPLAYED?" and "LAST VERSION?" of the location information record 102 and "Yes" is entered in each of the item of "DISPLAYED?" and "LAST VERSION?" of the location information record 103.

An example of representation of the pooled information screen and the location management screen according to the present embodiment will be described in more concrete manner with reference to FIGS. 9 and 10.

FIG. 9 is a diagram showing one example of pooled information screen 151 formed by the pooled information screen forming unit 37 and displayed on the display unit 40. According to the pooled information screen 151 shown in FIG. 9, there are displayed an introduction indication 152 indicative of information concerning introduction, a movement indication 156 indicative of information concerning movement, an approval check box 153 for entering selection of whether the introduction and movement indicated by the indications 152, 156 shall be approved or not, an approval button 154 for entering approval on the selected information concerning introduction and movement, and a cancel button 155 for entering cancellation on the introduction and movement (deleting the corresponding information from the location information file 101). In the case represented in the figure, the introduction indication 152 is selected by clicking with a mouse or the like to attach a check mark at the approval check box 153. When a POS terminal is moved from one location to another, which fact includes the POS terminal is once removed at the one location and the same POS terminal is introduced into the system at the another location. As shown in the pooled information screen 151 of FIG. 9, removal information about the POS terminal 22 is not indicated because the removal information is included in the movement information.

Figure 10:
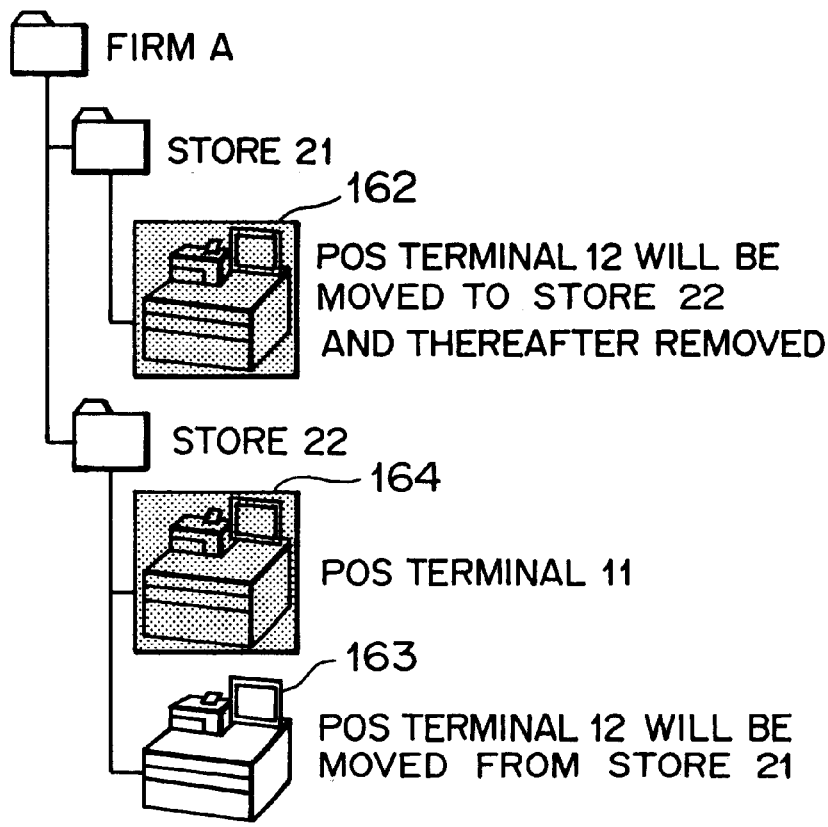
FIG. 10 is a diagram showing an example of displayed image of the location management screen according to one embodiment of the present invention.

FIG. 10 is a diagram showing a location information displaying screen (location management screen) 161 formed by the system arrangement change updating unit 38 and the location information screen forming unit 39 and displayed on the display unit 40. The location information displaying screen 161 is a screen displaying the whole arrangement of the POS terminals under monitoring. POS terminal icons 162, 163, 164 indicative of POS terminals (the number of these icons 162 to 164 can be increased or decreased depending on introduction, movement and removal of the POS terminal) represented in a tree structure manner.

When the POS terminal 11 is introduced into the system, the operator (manager) of the present remote monitoring system 10 can be informed of the introduction by the pooled information screen 151. The operator also can confirm at which location the POS terminal 11 is introduced. For example, if the POS terminal 11 is planed to introduce into the system at the store 22, a POS terminal icon 164 is displayed in the location information displaying screen 161. In order to distinguish the POS terminal icon 164 from other POS terminal icons which has been already introduced, the POS terminal icon 164 is displayed on a blinking background and further attached with a message stating that the POS terminal is introduced. With this manner of display, the manager of the system can be informed of the location (store 22) at which the POS terminal 11 is introduced. If the manager determines that it is allowable to introduce the POS terminal 11 into the system, the manager will the approval check box 153 displayed on the side of the indication of the corresponding information in the pooled information screen 151. Then, if the approval button 154 is depressed, the system arrangement change updating unit 38 updates the information stored in the location information file 101. In this way, the location information displaying screen 161 can be updated in accordance with information concerning the introduction of the POS terminal without editing a separate location information displaying screen.

The system arrangement change updating unit 38 is started up through two modes, i.e., mode in which it is started up through the pooled information screen 151 and mode in which it is started up automatically. The system arrangement change updating unit 38 may be settled in its starting-up mode selectively. If the automatic starting-up mode is settled, the location information displaying screen 161 is automatically updated in accordance with information concerning the introduction, movement or removal of the POS terminal without modifying the pooled information screen 151. In this way, the location information displaying screen 161 can be edited automatically in accordance with the information concerning the introduction, movement or removal of the POS terminal.

Now operation of the consumption component information detecting unit 41 of the present embodiment will be described together with the process for correcting and setting the near-end value for managing the consumption component management, with reference to a flowchart including steps S11 to S25 of FIG. 11.

Figure 11:
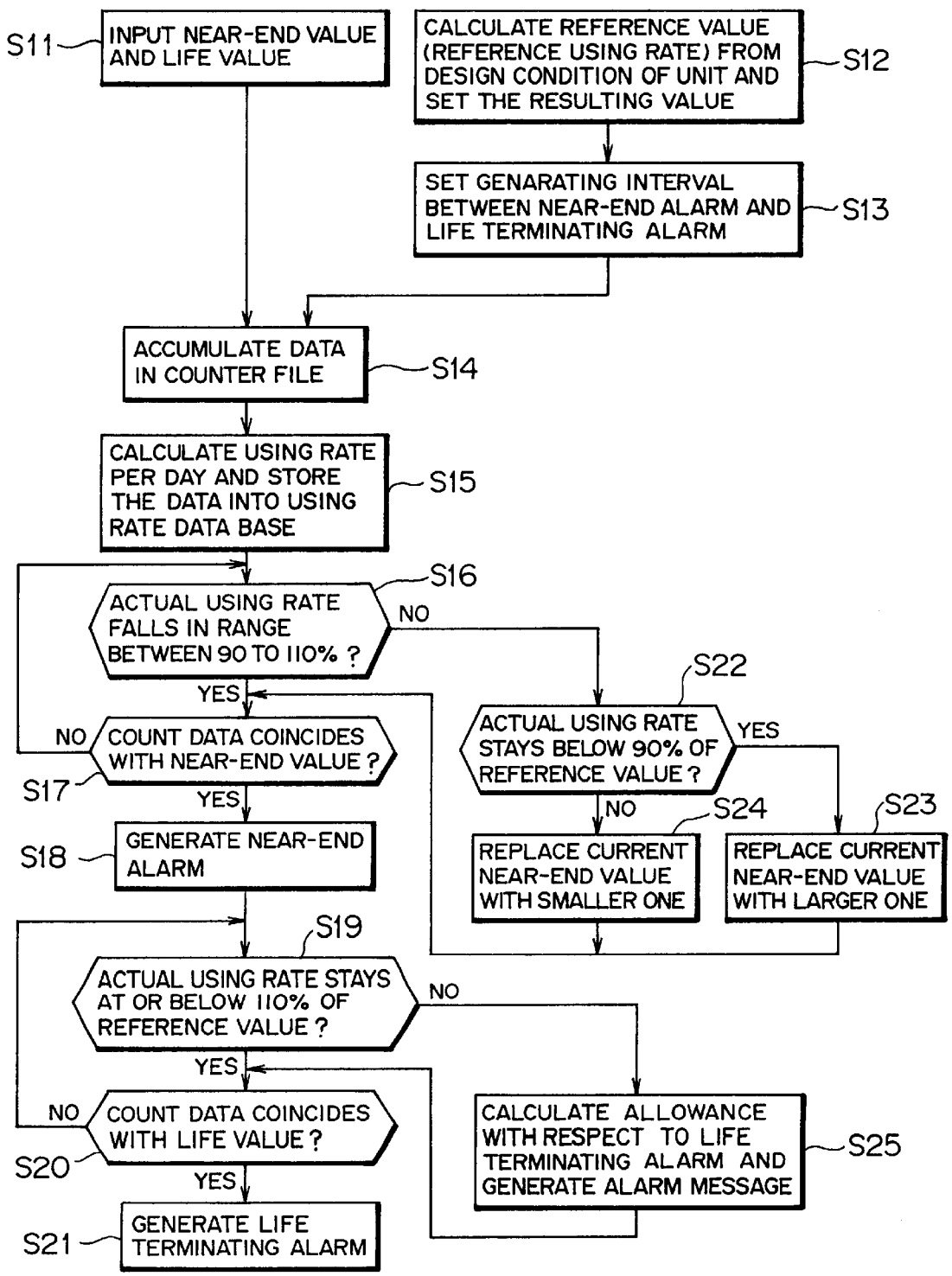
FIG. 11 is a flowchart useful for explaining a replacing process for correcting and setting a near-end value for managing a consumption component with new one (operation of the consumption component information detecting unit of the embodiment) according to one embodiment of the present invention.
Figure 12:
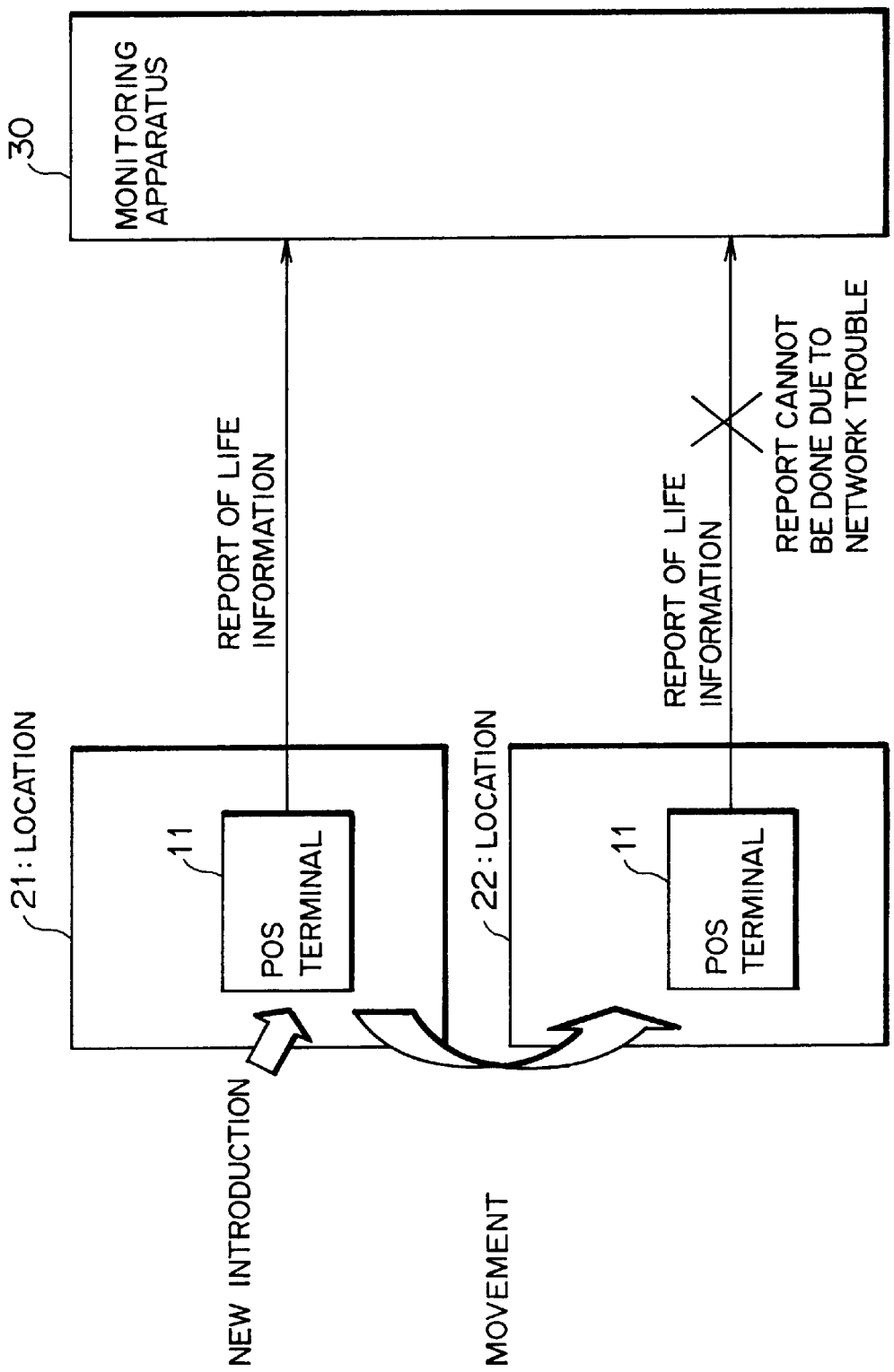
FIG. 12 is a diagram useful for explaining an operation for reporting life information.
Figure 13:
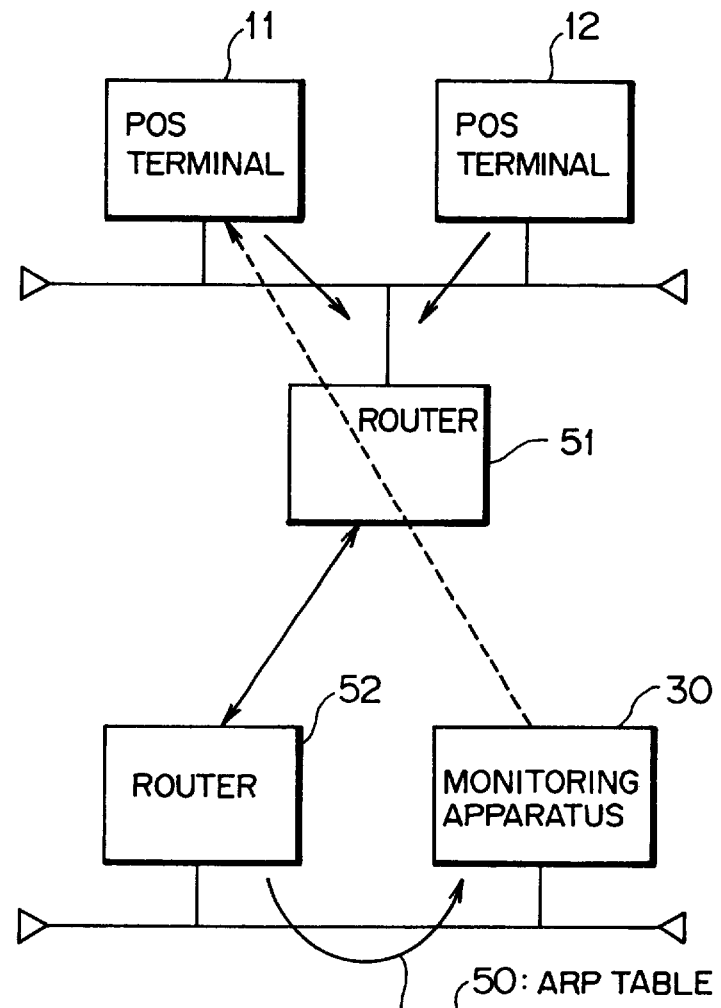
FIG. 13 is a diagram useful for explaining a scheme of collecting location information using ARP or PING.
Figure 14:
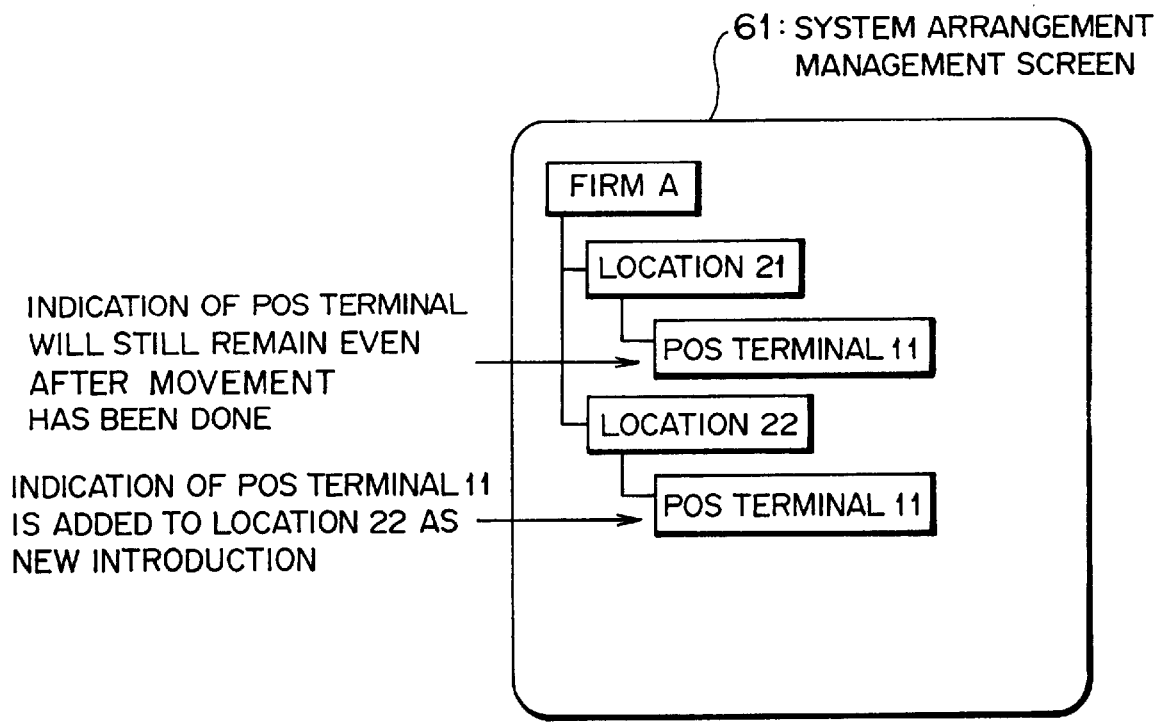
FIG. 14 is a diagram useful for explaining the operation of management and display of the location information.
Figure 15:
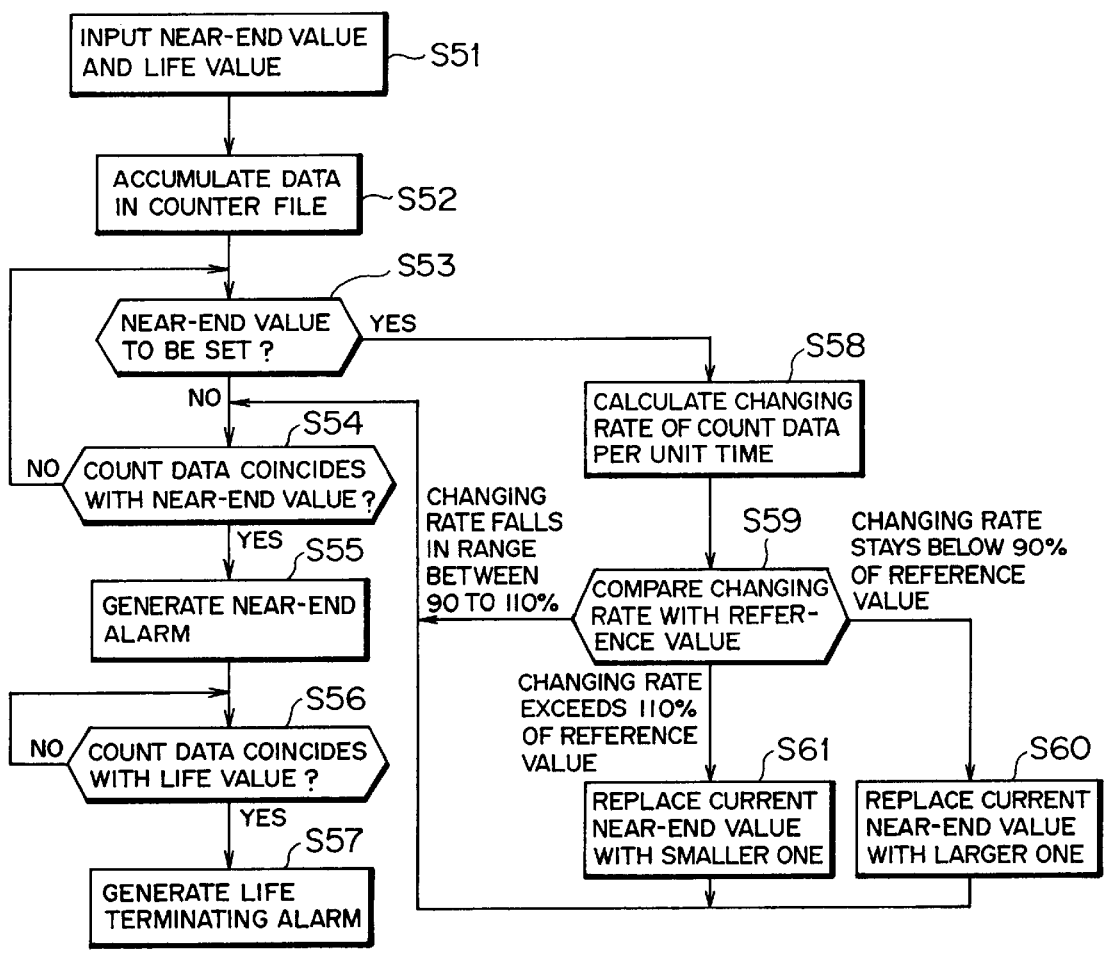
FIG. 15 is a flowchart useful for explaining a current process for monitoring a consumption component including a process for correcting and setting the near-end value for managing the consumption component in a remote monitoring system.

As shown in FIG. 11, the near-end value of the consumption component and an initial set value of an expected life of the consumption component are set at step S11. A reference value (reference using rate) is calculated based on the design condition of the POS terminal and set at step S12. Further, an interval between the near-end alarm and the life terminating alarm (e.g., three months) is set at step S13.

Thereafter, the POS terminal is brought into an actual operation mode. During the operation of the POS terminal, the using condition detecting unit 201 detects the using condition of the consumption component and generates numerical data indicative of the using condition of the consumption component (i.e., count data such as a number of typed line of a thermal printer, display time of a CRT), and stores the numerical data into the counter file 202 at step S14.

The actual using rate calculating unit 207 calculates the actual using rate (actual spending) per unit time (e.g., a day) of the consumption component based on the count data stored in the counter file 202. The calculated using rate is stored in the actual using rate data base 208 for each consumption component (device) at step S15.

The actual using rate per unit time of the consumption component stored in the actual using rate data base 208 is periodically read by the comparing unit 209 and compared with the reference value set at step S12 (steps S16, S22).

If the comparison made by the comparing unit 209 reveals that the actual using rate falls within a range of 90 to 110% of the reference value (YES route of step S16), the current set near-end value is maintained and the processing proceeds to step S17.

On the other hand, if it is determined that the actual using rate stays below 90% of the reference value (from NO route of step S16 to YES route of step S22), the setting unit 210 replaces the current near-end value with a larger one (step S23) so that the time interval between the near-end alarm and the life terminating alarm is kept to be a desired interval. Then, the processing proceeds to step S17.

If it is determined that the actual using rate exceeds 110% of the reference value (from NO route of step S16 to NO route of step S22), the setting unit 210 replaces the current near-end value with a smaller one (step S24) so that the time interval between the near-end alarm and the life terminating alarm is kept to be a desired interval. Then, the processing proceeds to step S17.

The near-end value comparing unit 203 compares the count data stored in the counter file 202 with the near-end value at step S17. If the comparison reveals that the count data reaches the near-end value (YES route of step S17), the near-end alarm generating unit 204 generates a near-end alarm at step S18.

Even after the near-end alarm has been generated, the comparing unit 209 carries on comparing operation for comparing the actual using rate per unit time of the consumption component stored in the actual using rate data base 208 with the reference value. If it is detected that the actual using rate exceeds 110% of the reference value (NO route of step S19), the alarm message generating unit 211 calculates the allowance up to the life terminating alarm (left time interval to the end of expected life) and generates an alarm message containing the calculating result at step S25.

After the alarm message is generated or if it is determined that the actual using rate stays below 110% of the reference value (YES route of step S19), the life value comparing unit 205 compares the count data stored in the counter file 202 with the life value at step S20. If the consumption component is not replaced with a new one and it is determined that the count data reaches the life value (YES route of step S21), then the life terminating alarm generating unit 206 generates a life terminating alarm at step S21.

If the consumption component is exchanged with a new one in response to the life terminating alarm, then the date, the number of times of replacing operations having been carried out so far, and the number of days after the last component replacement is carried out may be stored into a parameter register as parameter data so as to bring them under management. Also, if the consumption component is exchanged with a new one due to a trouble of the component, the date, the number of times of replacing operations having been carried out so far, and the number of days after the last component replacement is carried out may be stored into a parameter register as parameter data so as to bring them under management. These parameter data may be taken into account when the setting unit 210 replaces the current near-end value with a new one. In this manner, the interval between the near-end alarm and the life terminating alarm can be more positively kept constant.

As described above, according to the remote monitoring system 10 of the embodiment of the present invention, when the POS terminal 11, 12 is introduced into the system or moved within the system, it is possible to automatically determine whether or not the POS terminal is physically connected to the network but also whether or not the report from the center reporting unit 42 to the monitoring system 30 can be carried out without failure. Accordingly, the introduced or moved POS terminal 11, 12 can be brought into an actual operation mode with ease, and a worker such as a CE or the like can be remarkably relieved from a load of maintenance of the system.

Moreover, according to the above arrangement, information concerning introduction, movement or removal of the POS terminal 11, 12 (system arrangement information, location information) is reported together with test data to the monitoring apparatus 30. Therefore, the monitoring apparatus 30 can collect information of location status of the POS terminal 11, 12 when the POS terminal 11, 12 is introduced, moved or removed, together with the test data report, without transmitting a packet or the like on the ISDN network periodically. That is, it is possible for the monitoring apparatus 30 to collect the information of the location status of the POS terminal 11, 12 and bring them under its supervision, without imposing a load on the ISDN network 15.

When the POS terminal 11, 12 is introduced into the system or moved within the system, the operator inputs a starting instruction through the display/console panel 44 to start up the test data reporting unit 43. The operator also inputs inherent information of the POS terminal 11, 12 through the display/console panel 44. The result of checking the reporting function of the center reporting unit 42 carried out by the test data reporting unit 43 is reported to the operator. Thus, the reporting function of the center reporting unit 42 can be positively confirmed with ease by the worker who carries out the operation of introduction, movement or removal of the POS terminal 11, 12.

Further, the location status of the POS terminal 11, 12 is displayed in the location management screen 61, 161 on the display unit 40 of the monitoring apparatus 30 in accordance with information concerning introduction, movement or removal of the POS terminal 11, 12. Therefore, the location management screen 61, 161 can be automatically updated in accordance with the information concerning introduction, movement or removal of the POS terminal 11, 12 each time the information concerning introduction, movement or removal of the POS terminal 11, 12 (unauthorized information concerning introduction, movement or removal of the POS terminal 11, 12) is supplied to the system. Accordingly, the manager of the system need not carry out update operation manually on the location management screen 61, 161 in accordance with the information concerning introduction, movement or removal of the POS terminal 11, 12, with the result that the number of works spent for maintaining the location management screen 61, 161 can be reduced and the manager can be remarkably relieved from a load for maintaining the system.

At this time, before the location management screen 61, 161 is updated in accordance with the information concerning introduction, movement or removal of the POS terminal 11, 12, an indication indicating the information concerning introduction, movement or removal of the POS terminal 11, 12 is displayed on the pooled information screen 111, 151 so that the manager can be informed of that the POS terminal 11, 12 is introduced, moved, or removed. Therefore, the manager is given a chance to confirm the introduction, movement or removal of the POS terminal 11, 12 and hence the manager can selectively approve the introduction, movement or removal of the POS terminal 11, 12 on the pooled information screen 111, 151 and updates the location management screen 61, 161 based on the selectively approved introduction, movement or removal of the POS terminal 11, 12. In this way, the manager can always grasp the current location status of the POS terminals 11, 12 and bring the status under his/her management by means of the location management screen 61, 161.

In addition, before the manager settles the updating operation on the location management screen 61, 161 in relation with the introduction, movement or removal of the POS terminal 11, 12, the system arrangement management screen 61, 161 is formed so that an indication of the POS terminal 11, 12 corresponding to a location status which is going to be updated based on the information of the introduction, movement or removal is displayed in a manner different from a manner in which an indication of the same corresponding to a location status last updated is displayed. Therefore, the manager can positively recognize the arrangement status deriving from introduction, movement and removal of the POS terminal 11, 12.

Further, according to the present invention, if the information containing the inherent information identical to the inherent information of the POS terminal (name of terminal) corresponding to the status in which the introduction, movement or removal is not approved, is stored in the location information file 101, then it is determined that the POS terminal having the inherent information is moved. Thereafter, the indication of the POS terminal at the status in which the movement has not been carried out is deleted from the location management screen 61, 161, so that the location management screen 61, 161 is updated in accordance with the status in which the POS terminal has been moved.

Therefore, the indication (icon) of the POS terminal corresponding to the status in which the POS terminal has not been moved is not left undeleted on the location management screen 61, 161, and the location management screen 61, 161 is automatically updated in accordance with the current arrangement status of the POS terminal without dependence on the manual operation of the manager. Accordingly, the manager can be relieved from the load remarkably.

At this time, before the indication (icon) of the POS terminal corresponding to the status in which the POS terminal has not been moved is deleted from the location management screen 161, a message stating that the POS terminal before the movement is going to be removed is displayed on the location management screen 161 (as for example shown with the icon 162 of FIG. 10). Therefore, the manager can positively recognize which POS terminal is moved or removed.

Furthermore, according to the embodiment of the present invention, the location information of the POS terminals is collected and accumulated in the location information file 101. Therefore, the prior status of the location of the POS terminal can be reproduced based on the accumulated location information.

On the other hand, according to the remote monitoring apparatus of the present embodiment, as has been described above, the near-end value is automatically set without dependence upon the determination or manual operation of the worker or manager. Therefore, the interval between the timing point when the consumption component reaches the near-end and the timing point when the consumption component reaches the end of life can be positively maintained in a desired manner.

Accordingly, even if the number of POS terminals under monitoring is increased, all POS terminals can be positively monitored without imposing a lord on the worker such as a CE or a manager. Further, the consumption component can be replaced efficiently at a proper timing, that is, the consumption component can be positively replaced with a new one before the component is worn out to cause a trouble. Similarly, the consumption component can be prevented from being replaced too early, with the result that the consumption component can be effectively utilized.

Furthermore, after the near-end state is detected, if it is found that the actual using rate per unit time of the consumption component is abruptly increased, the manager can be informed of the fact by the alarm message. Therefore, the manager can be aware that little allowance is left from the near-end state to the life terminating state. Therefore, if the consumption component is replaced with a new one a little earlier, it is possible to prevent the consumption component from being brought to the worn-out stage due to the erroneous estimation of the life of the component.

The present invention is not limited to the above embodiments but various modification can be effected without departing the scope of the present invention.

For example, according to the above-described embodiment, description has been made on a case where the object apparatus is a POS terminal, the present invention is not limited to the case but a personal computer, a bank terminal including an ATM (Automatic Teller Machine) or various other apparatus can undergo the monitoring as an object apparatus. Also the present invention can be applied to the remote monitoring apparatus for monitoring these terminals and produces effects similar to those obtained by the above-described embodiment.

What is claimed is:

1. A remote monitoring system, comprising:
   an object apparatus to be monitored; and
   a monitoring apparatus, installed remotely from said object apparatus in said remote monitoring system, monitoring a current state of said object apparatus over a communications network;
   said object apparatus comprising
      a state information reporting unit reporting information about the current state of said object apparatus via the communications network, and
      a test data generating unit, responsive to a start-up of said object apparatus when said object apparatus is introduced into or moved within said remote monitoring system, generating test data and controlling said state information reporting unit to output the test data to said monitoring apparatus via the communications network;
   said monitoring apparatus comprising
      a test data returning unit returning the test data back to said object apparatus via the communications network so that said test data generating unit of said object apparatus compares the returned test data with the test data from said test generating unit to discriminate whether said state information reporting unit is in condition for normal reporting when the return test data is same as the test data from said test generating unit.

2. The remote monitoring system according to claim 1, wherein the test data generated by said test data generating unit comprises inherent information of said object apparatus and location information about a location where introduction, movement or removal of said object apparatus has taken place, said location information being attached to the test data before the test data is output to said monitoring apparatus.

3. The remote monitoring system according to claim 2, wherein said monitoring apparatus further comprises
   an extracting unit extracting said inherent information and said location information out of the test data received from said object apparatus via the communications network as introduction information, movement information, or removal information of said object apparatus;
   a location information storage section storing said introduction information, said movement information, or said removal information extracted by said extracting unit; and
   a location information managing unit managing said introduction information, said movement information, or said removal information stored in said location information storage section.

4. The remote monitoring system according to claim 2, further comprising:
   a relaying apparatus relaying the test data from said object apparatus to the communications network, said relaying apparatus comprising
   a location information attaching unit attaching said location information to the test data before the test data is forwarded via the communications network to said monitoring apparatus.

5. The remote monitoring system according to claim 1, wherein said object apparatus further comprises
   an operation unit inputting a start instruction to start up said test data generating unit and inherent information of said object apparatus when said object apparatus is introduced or moved.

6. The remote monitoring system according to claim 5, wherein said operation unit of said object apparatus has a discrimination notifying function notifying an operator of said object apparatus of a result of discrimination from said test data generating unit as to whether said state information reporting unit is in condition for normal reporting.

7. The remote monitoring system according to claim 3, wherein said location information managing unit of said monitoring apparatus comprises
   a display section displaying a state of installation of said object apparatus based on said introduction information, said movement information, or said removal information, as a location management screen.

8. The remote monitoring system according to claim 7, wherein said location information managing unit of said monitoring apparatus comprises
   a location change updating unit dynamically updating said location management screen displayed on said display section in accordance with said introduction information, said movement information, or said removal information.

9. The remote monitoring system according to claim 8, wherein said location information managing unit of said monitoring apparatus comprises
   a pooled information display unit displaying, in addition to said location management screen, a pooled information screen showing said introduction information, said movement information, or said removal information of said object apparatus, to notify an operator of said monitoring apparatus that the introduction, movement, or removal of said object apparatus has taken place, before said location management screen is updated in accordance with said introduction information, said movement information, or said removal information by said location change updating unit.

10. The remote monitoring system according to claim 9, wherein said location change updating unit updates said location management screen of said display section in accordance with said introduction information, said movement information, or said removal information as selected or designated on said pooled information screen.

11. The remote monitoring system according to claim 8, wherein said location change updating unit displays, in said location management screen, a state of installation of said object apparatus, which is related with said introduction information, said movement information or said removal information, in a fashion other than that in which the state of installation of said object apparatus has currently been displayed in said location management screen, before updating of said location management screen in accordance with said introduction information, said movement information and said removal information is executed.

12. The remote monitoring system according to claim 8, wherein if said introduction information, movement information, or removal information have the same inherent information as that of said object apparatus, which is contained in said introduction information, said movement information or said removal information before said location management screen is updated and stored in said location information storing unit, said location change updating unit judges that said object apparatus having said inherent information has been moved, and deletes the display of the original location of said object apparatus on said location management screen to update said location management screen with respect to a state of movement of said object apparatus.

13. The remote monitoring system according to claim 12, wherein said location change updating unit displays, on said location management screen, a schedule to remove said object apparatus from its original location of movement, before deleting on said location management screen the display relating to said object apparatus at the original location of movement.

14. The remote monitoring system according to claim 1, wherein said object apparatus is a point of sales (POS) terminal.

15. The remote monitoring system according to claim 4, wherein said object apparatus is a point of sales (POS) terminal installed in each of a plurality of stores, and said relaying apparatus plays as a store server installed in each of said plurality of stores, said store server being operable to add to the test data store information relating to the location of introduction, movement, or removal of said object apparatus.

16. A remote monitoring system, comprising:

an object apparatus generating test data to the monitoring apparatus via a communications network; and a monitoring apparatus monitoring a current state of the object apparatus over the communications network by returning the test data back to the object apparatus via the communications network so that the object apparatus compares the returned test data with the test data from the object apparatus to determine whether the object apparatus is in condition for normal reporting when the returned test data is unchanged from the test data from the object apparatus.

17. The remote monitoring system according to claim 16, wherein the object apparatus comprises a state information reporting unit outputting information about the current state of the object apparatus via the communications network, and a test data generating unit, responsive to a start-up of the object apparatus when the object apparatus is introduced into or moved within the remote monitoring system, generating the test data and controlling the state information reporting unit.

18. The remote monitoring system according to claim 16, wherein the monitoring apparatus comprises a test data returning unit returning the test data back to the object apparatus via the communications network so that the test data generating unit of the object apparatus performs the comparison of the returned test data with the test data from the object apparatus to discriminate whether the state information reporting unit is in condition for the normal reporting.

19. The remote monitoring system according to claim 18, wherein the test data generated by the test data generating unit comprises inherent information of the object apparatus and location information about a location where introduction, movement or removal of the object apparatus has taken place, the location information being attached to the test data before the test data is output to the monitoring apparatus.

20. The remote monitoring system according to claim 19, wherein the monitoring apparatus further comprises an extracting unit extracting the inherent information and the location information out of the test data received from the object apparatus via the communications network as introduction information, movement information, or removal information of the object apparatus;

a location information storage section storing the introduction information, the movement information, or the removal information extracted by the extracting unit; and a location information managing unit managing the introduction information, the movement information, or the removal information stored in the location information storage section.

21. The remote monitoring system according to claim 20, wherein the monitoring apparatus comprises a display section displaying a state of installation of the object apparatus based on the introduction information, the movement information, or the removal information, as a location management screen.

22. The remote monitoring system according to claim 21, wherein the location information managing unit of the monitoring apparatus comprises a location change updating unit dynamically updating the location management screen displayed on the display section in accordance with the introduction information, the movement information, or the removal information.

23. The remote monitoring system according to claim 22, wherein the location change updating unit displays, on the location management screen, a schedule to remove the object apparatus from an original location of movement of the object apparatus, before deleting on the location management screen the display relating to the object apparatus at the original location of movement.

* * * * *